United States Patent
Chen et al.

(10) Patent No.: US 11,526,816 B2
(45) Date of Patent: Dec. 13, 2022

(54) CONTEXT-BASED REMOTE AUTONOMOUS VEHICLE ASSISTANCE

(71) Applicant: Uber Technologies, Inc., San Francisco, CA (US)

(72) Inventors: Sean Shanshi Chen, San Francisco, CA (US); Samann Ghorbanian-Matloob, San Francisco, CA (US); Brent Justin Goldman, San Francisco, CA (US); Michael Guanran Huang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 488 days.

(21) Appl. No.: 16/573,560

(22) Filed: Sep. 17, 2019

(65) Prior Publication Data
US 2020/0272949 A1    Aug. 27, 2020

Related U.S. Application Data

(60) Provisional application No. 62/811,168, filed on Feb. 27, 2019.

(51) Int. Cl.
*G06Q 10/02* (2012.01)
*G06Q 10/06* (2012.01)
(Continued)

(52) U.S. Cl.
CPC ........... *G06Q 10/02* (2013.01); *G05D 1/0088* (2013.01); *G05D 1/0212* (2013.01);
(Continued)

(58) Field of Classification Search
CPC .. G05D 1/0088; G05D 1/0212; G05D 1/0276; G05D 2201/0212–0213;
(Continued)

(56) References Cited

U.S. PATENT DOCUMENTS

| 4,405,943 A | 9/1983 | Kanalv |
| 6,405,132 B1 | 6/2002 | Breed |

(Continued)

FOREIGN PATENT DOCUMENTS

| EP | 3931773 A1 | 1/2022 |
| IN | 202127038567 A | 11/2021 |

(Continued)

OTHER PUBLICATIONS

Written Opinion of the International Searching Authority for PCT/US2020/019660 dated Sep. 3, 2020. (Year: 2020).*

(Continued)

*Primary Examiner* — Calvin Cheung
(74) *Attorney, Agent, or Firm* — Schwegman Lundberg & Woessner, P.A.

(57) ABSTRACT

Systems and methods for controlling autonomous vehicles are provided. Assisted autonomy tasks facilitated by operators for a plurality of autonomous vehicles can be tracked in order to generate operator attributes for each of a plurality of operators. The attributes for an operator can be based on tracking one or more respective assisted autonomy tasks facilitated by the operator. The operator attributes can be used to facilitate enhanced remote operations for autonomous vehicles. For example, request parameters can be obtained in response to a request for remote assistance associated with an autonomous vehicle. An operator can be selected to assist with autonomy tasks for the autonomous vehicle based at least in part on the operator attributes for the operator and the request parameters associated with the request. Remote assistance for the first autonomous vehicle can be initiated, facilitated by the first operator in response to the request for remote assistance.

20 Claims, 11 Drawing Sheets

(51) Int. Cl.
*G05D 1/00* (2006.01)
*H04W 4/40* (2018.01)
*G06Q 50/30* (2012.01)
*G05D 1/02* (2020.01)

(52) U.S. Cl.
CPC ..... *G05D 1/0276* (2013.01); *G06Q 10/06315* (2013.01); *G06Q 50/30* (2013.01); *H04W 4/40* (2018.02); *G05D 2201/0212* (2013.01); *G05D 2201/0213* (2013.01)

(58) Field of Classification Search
CPC ... H04W 4/40; G06Q 10/02; G06Q 10/06315; G06Q 50/30
See application file for complete search history.

(56) References Cited

U.S. PATENT DOCUMENTS

| | | | |
|---|---|---|---|
| 7,359,004 | B2 | 4/2008 | Yu |
| 8,370,392 | B1 | 2/2013 | Hunt |
| 8,601,595 | B2 | 12/2013 | Gelvin |
| 9,384,402 | B1 | 7/2016 | Furman |
| 9,507,346 | B1 | 11/2016 | Levinson |
| 9,612,123 | B1* | 4/2017 | Levinson ............... G01C 21/26 |
| 2007/0185646 | A1 | 8/2007 | Neuqebauer |
| 2011/0208417 | A1 | 8/2011 | Fink |
| 2015/0178953 | A1 | 6/2015 | Gao |
| 2015/0244826 | A1 | 8/2015 | Stenneth |
| 2015/0248131 | A1 | 9/2015 | Fairfield |
| 2016/0139594 | A1 | 5/2016 | Okumura |
| 2016/0358475 | A1 | 12/2016 | Prokhorov |
| 2017/0192423 | A1 | 7/2017 | Rust |
| 2017/0223712 | A1 | 8/2017 | Stephens |
| 2018/0114258 | A1 | 4/2018 | Ross et al. |
| 2018/0181118 | A1 | 6/2018 | Yoneda |
| 2018/0257661 | A1 | 9/2018 | Kroop |
| 2018/0281815 | A1 | 10/2018 | Stentz |
| 2018/0356814 | A1* | 12/2018 | Brooks ................ A61B 5/18 |
| 2020/0050190 | A1* | 2/2020 | Patel ................. G05D 1/0061 |

FOREIGN PATENT DOCUMENTS

| | | | |
|---|---|---|---|
| WO | WO 2017/079222 | 5/2017 | |
| WO | WO-2019106318 A1 * | 6/2019 | .......... G05D 1/0022 |
| WO | WO-2020176474 A1 | 9/2020 | |

OTHER PUBLICATIONS

International Search Report and Written Opinion for Application No. PCT/US2020/019660, dated Jul. 6, 2020, 16 pages.

Fong, Terrence et al., "Vehicle teleoperation interfaces", Autonomous Robots 11, pp. 9-18. 2001.

Reuschenbach, Arturo et al., "iDriver—human machine interface for autonomous cars", 2011 Eighth International Coference on Information Technology: New Generations, Las Vegas, NV 2011, pp. 435-440.

European Application Serial No. 20714059.1, Response to Communication persuant to Rules 161 and 162 filed Apr. 19, 2022, 29 pgs.

International Application Serial No. PCT/US2020/019660, International Preliminary Report on Patentability dated Sep. 10, 2021, 21 pgs.

International Application Serial No. PCT/US2020/019660, Invitation to Pay Additional Fees mailed May 13, 2020, 9 pgs.

\* cited by examiner

| | OPERATOR ID ~510 | TIMESTAMP ~512 | LOCATION(S) ~514 | VEHICLE ~516 | VEHICLE TYPE ~518 | VENDOR ~520 | TASK TYPE ~522 | VEHICLE CAPABILITIES ~524 |
|---|---|---|---|---|---|---|---|---|
| 502 | OPERATOR A | 2:19:00GMT 01JAN2019 | SECOND ST., 11111 | 144456789 | MODEL 1 | VENDOR ACC | ROAD OBSTRUCTION | UNPROTECTED LEFT-HAND TURNS |
| 504 | OPERATOR A | 18:14:41GMT 02JAN2019 | THIRD ST., 11111 | 155556789 | MODEL 3 | VENDOR BCC | UNPREDICTED OBJECT STATE | OPERABLE IN SNOW |
| 506 | OPERATOR B | 06:42:03GMT 02JAN2019 | FOURTH ST., 11112 | 123444789 | MODEL 4 | VENDOR AAA | UNCLASSIFIED OBJECT | FOUR-WAY INTERSECTION |

FIG. 5

| REQUEST ID | TIMESTAMP | LOCATION | VENDOR | VEHICLE TYPE | VEHICLE | TASK TYPE | VEHICLE CAPABILITIES |
|---|---|---|---|---|---|---|---|
| REQUEST 001 | 1:24:46GMT 02JAN2019 | 123 FIRST ST., 11111 | VENDOR ABC | MODEL 1 | 123466789 | UNCLASSIFIED OBJECT | MAX SPEED 26MPH |
| REQUEST 002 | 12:12:23GMT 02JAN2019 | 40.6892° N, 74.0446° W | VENDOR ABB | MODEL 2 | 113466789 | MOTION PATH IS OBSTRUCTED | U-TURNS |
| REQUEST 003 | 09:08:12GMT 03JAN2019 | 38.8977° N, 77.0366° W | VENDOR ACB | MODEL 4 | 111166789 | REQUEST FOR CABIN CHECK | UNPROTECTED LEFT-HAND TURNS |

FIG. 6

CONTEXT-BASED REMOTE AUTONOMOUS VEHICLE ASSISTANCE

RELATED APPLICATION

This application claims priority to and the benefit of U.S. Provisional Patent Application No. 62/811,168, filed Feb. 27, 2019, which is hereby incorporated by reference in its entirety.

FIELD

The present disclosure relates generally to improvements in the operation of autonomous vehicles, and more particularly, to improvements in computing systems associated with providing remote autonomous vehicle assistance to autonomous vehicles.

BACKGROUND

As autonomous vehicle driving technology improves, autonomous vehicles have become increasingly useful in a number of technology fields. One key potential use of autonomous vehicles is to provide on-demand transportation services to passengers and organizations that have need of transportation services. Such services can include passenger transportation, a courier service, and a delivery service. Managing such an on-demand transportation service can include providing a variety of services to passengers and autonomous vehicles. For example, a service provider can provide remote assistance to a plurality of autonomous vehicles (or passengers in an autonomous vehicle), especially in cases where the autonomous vehicles encounter problems that they cannot solve independently.

To provide such remote assistance, a remote assistance system employs a plurality of operators, either human or automated, who help resolve issues that the autonomous vehicle cannot resolve. The plurality of operators can have differing characteristics. As such, the effectiveness of the remote assistance system in resolving a particular request for remote assistance depends, at least partially, on the operator that is assigned to handle the particular request for remote assistance.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method can include tracking, by a computing system comprising one or more computing devices, a plurality of assisted autonomy tasks facilitated by a plurality of operators for a plurality of autonomous vehicles. The method can further include generating, by the computing system, a respective plurality of operator attributes for each operator of the plurality of operators based on tracking one or more respective assisted autonomy tasks facilitated by such operator. The method can further include obtaining, by the computing system, one or more request parameters corresponding to a request for remote autonomous vehicle assistance associated with a first autonomous vehicle. The method can further include determining, by the computing system, a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance. The method can further include initiating, by the computing system, remote autonomous vehicle assistance for the first autonomous vehicle facilitated by the first operator in response to the request for remote autonomous vehicle assistance.

Other example aspects of the present disclosure are directed to systems, methods, vehicles, apparatuses, tangible, non-transitory computer-readable media, and memory devices for controlling autonomous vehicles and efficiently using the computational resources of the autonomous vehicles and remote computing systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts an example data structure including operator attributes according to example embodiments of the present disclosure;

FIG. 6 depicts an example data structure including request parameters according to example embodiments of the present disclosure;

DETAILED DESCRIPTION

Figure 1:
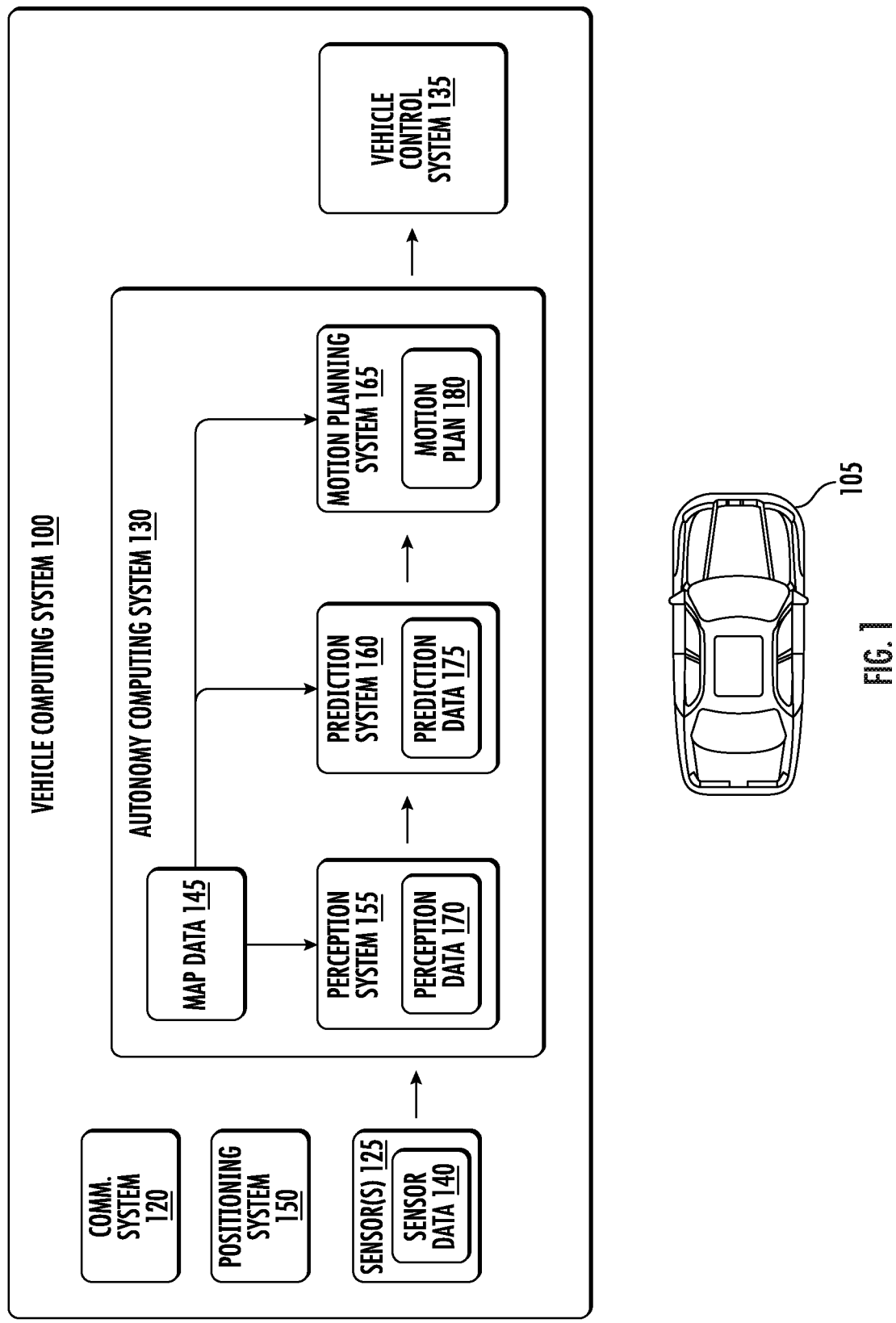
FIG. 1 depicts an example autonomous vehicle computing system according to example embodiments of the present disclosure.

Example aspects of the present disclosure are directed to improvements in the operation of autonomous vehicles, and more particularly, to improvements in computing systems associated with providing remote autonomous vehicle assistance to autonomous vehicles. An autonomous vehicle may request remote autonomous vehicle assistance from a remote autonomous vehicle assistance system including one or more computing devices configured to assist the autonomous vehicle with one or more autonomous computing tasks. By way of example, an autonomy computing system may request remote autonomous assistance for autonomous computing tasks such as object classification, object prediction, mapping, motion planning, vehicle status checks, etc. Such tasks may typically be performed onboard the autonomous vehicle by the vehicle computing system. In some instances, however, an autonomous vehicle may request that a remote autonomous vehicle assistance system provide autonomous vehicle assistance with one or more vehicle computing tasks. For example, the remote assistance system may perform one or more assisted autonomy tasks to assist with one or more autonomous computing tasks at the autonomous vehicle. The remote vehicle assistance system may engage one or more operators (e.g., human or computer) to at least partially facilitate responses to requests for remote assistance. For example, sensor data from the autonomous vehicle may be transmitted to the autonomous vehicle assistance system and viewed by an operator. The operator can provide input to the autonomous vehicle assistance system which can generate control messages for the autonomous computing system to assist with the autonomous computing task.

The systems and methods in accordance with embodiments of the present disclosure can help reduce the amount of computer resources and bandwidth associated with providing remote autonomous vehicle assistance that is at least partially facilitated by an operator. More particularly, one or more operators can be selected in response to a request for remote autonomous vehicle assistance based on operator attributes associated with the operators, as well as request parameters associated with a context of the request for remote assistance. To effectively assist the autonomy computing system of an autonomous vehicle, it can be important for an operator to be familiar with or otherwise understand the autonomous vehicle (e.g., type, vendor, etc.) and its autonomous computing system, one or more interfaces (e.g., graphical user interfaces, command line interfaces, etc.) for remotely interfacing with the autonomous computing system, a geographic area in which the autonomous vehicle is located, a particular autonomous computing task for which assistance is requested, vehicle capabilities, etc. In an environment where different types of autonomous vehicles are utilized in diverse geographic areas, it can be important that requests for remote assistance be handled by an appropriate operator. In an effort to reduce bandwidth and/or computer resources associated with such remote assistance, as well as to more efficiently handle requests for remote assistance with accurate responses, the remote autonomous vehicle assistance system can select one or more operators to facilitate an assisted autonomy task by the remote autonomous vehicle assistance system based on a comparison of operator attributes and request parameters.

In accordance with example embodiments, an autonomous vehicle assistance system can include one or more computing devices configured to track assisted autonomy tasks in order to generate operator attributes. The assisted autonomy tasks may be facilitated at least partially by a plurality of operators associated with the autonomous vehicle assistance system. Each assisted autonomy task can be associated with an autonomous computing task performed by an autonomous computing system of an autonomous vehicle. The autonomous vehicle assistance system can generate operator attributes for each operator based on tracking the assisted autonomy tasks performed by such operator. The operator attributes can include data that identifies an experience of an operator with particular autonomous computing tasks. By way of example, operator attributes may include data indicative of a vehicle type, a vehicle vendor, a vehicle capability, an autonomous computing task, a task type, a geographic area, and/or other information associated with assisted autonomy tasks facilitated by the operator.

The autonomous vehicle assistance system can analyze one or more request parameters associated with a request for remote autonomous assistance as part of selecting an operator to facilitate assisted autonomy tasks for the autonomous vehicle. Request parameters associated with the request for remote assistance transmitted by an autonomous vehicle or a user of an autonomous vehicle service may include data included with the request or may include data derived from the request for remote assistance. For example, request parameters may include data indicative of a location of the autonomous vehicle transmitting the request, data indicative of the autonomous vehicle issuing the request, data indicative of a type of the autonomous vehicle issuing a request, data indicative of one or more vehicle capabilities of the autonomous vehicle, data indicative of a vendor of the autonomous vehicle issuing the request, data indicative of a task type, and/or data indicative of an autonomous computing task for which assistance is requested. The remote autonomous vehicle assistance system can compare the one or more request parameters with the operator attributes to determine an operator to facilitate one or more assisted autonomy tasks in response to the request.

According to some examples, the operator attributes can include or otherwise be associated with time information so that operators can be selected based on a temporal proximity or correlation between operator attributes and the request parameters. The operator attributes can include or otherwise be associated with one or more time identifiers. The time identifiers can be utilized by the remote vehicle assistance system to identify an elapsed time since the assisted autonomy task associated with the operator attribute was performed by the operator. In this manner, the remote assistance system can weight operator attributes based on a recent familiarity with the operator attribute. As such, the autonomous vehicle assistance system can select an operator that recently assisted with a similar request for remote operator assistance. Additionally and/or alternatively, the operator attributes can include or otherwise be associated with location information so that operators can be selected based on a spatial proximity or correlation between operator attributes and the request parameters. By selecting operators based on operator attributes and request parameters that identify the context of a request for remote assistance, the request can be serviced more quickly and with consumption of fewer computing resources. This can enable fewer and quicker disruptions in autonomous vehicle service, among other benefits.

More particularly, an autonomous vehicle can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity. The autonomous vehicle can be various types of vehicles. For instance, the autonomous vehicle can be a ground-based autonomous vehicle such as an autonomous car, autonomous truck, autonomous bus, etc. The autonomous vehicle can be a light electric vehicle (e.g., bike, scooter, etc.). The autonomous vehicle can be an air-based autonomous vehicle (e.g., airplane, helicopter, or other aircraft) or other types of vehicles (e.g., watercraft, etc.).

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. For example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

A user can provide (e.g., via a user computing device) a request for a vehicle service to an operations computing system associated with the service entity. The request can indicate the type of vehicle service that the user desires (e.g., a user transportation service, a delivery service, a courier service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information.

The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system so that the vehicle computing system can communicate with the operations computing system via a network of the service entity. Once online, the operations computing system can communicate a vehicle service assignment indicative of the requested vehicle services and/or other data to the autonomous vehicle.

A service entity may directly control one or more autonomous vehicles that it operates to provide vehicle services. Additionally and/or alternatively, one or more third parties such as vehicle providers (e.g., vendors) may operate vehicles that provide vehicle services under the control of a service entity. As such, a remote assistance system may provide remote assistance for autonomous vehicles operated directly by a service entity and/or autonomous vehicles operated by third-parties that provide vehicle services under the control of the service entity. The service entity and/or third-party vehicle providers may utilize a range of different autonomous vehicles. The different autonomous vehicles may include vehicles from different vendors, different models of vehicles from the same vendor, different autonomy computing systems within vehicle models, and other variations. Even within the same type of vehicle, the autonomy computing system and/or range of tasks performed by the autonomy computing system may vary. Moreover, the service entity may operate vehicles in a large number of geographic areas.

When combined, these factors provide for a large number of potential requests for remote assistance from the autonomous vehicle assistance system. Accordingly, the autonomous vehicle assistance system and its associated operators may provide remote assistance over a wide range of request types. By way of example, the autonomous vehicle may encounter a travel way that is unexpectedly blocked by an obstruction (e.g., due to a fallen tree, etc.). The autonomous vehicle may not have a high enough confidence level to autonomously navigate the obstruction. Thus, the autonomous vehicle can send (e.g., via its onboard communication system) a communication requesting assistance from the autonomous vehicle assistance system. The autonomous vehicle assistance system can communicate with the autonomous vehicle (e.g., in at least near real-time) to provide classification assistance including assistance data such as an object classification for the fallen tree or path assistance including a target vehicle path to autonomously navigate the obstruction.

In accordance with example implementations, an operator may be assigned to a particular request for autonomous vehicle assistance in order to assist the autonomy computing system with autonomous computing tasks such as object classification, object prediction, mapping, motion planning, etc. To address the divergent types of requests, the remote assistance system can assign operators based on operator attributes indicating an operator's ability to facilitate assisted autonomy tasks and request parameters associated with a particular request.

According to some example implementations, an autonomous vehicle assistance system may include one or more computing devices. The computing system may include a request management system configured to process requests for remote assistance and generate one or more control messages for an autonomous computing system of an autonomous vehicle in response to the requests. According to some implementations, the autonomous vehicle assistance system can include a task tracking system that can generate operator attributes based on tracking the performance of assisted autonomy tasks by the plurality of operators. In some examples, a remote assistance interface may provide tracking data to the task tracking system. The tracking data may identify an operator and one or more assisted autonomy tasks performed by the operator. The data may include data indicative of a particular vehicle, vehicle type, geographic area, time, and/or assistance type associated with the assisted autonomy task. In some implementations, the data may be indicative of the capabilities (e.g., ability to travel in snowfall, make unprotected lefts, make U-turns, etc.) or lack thereof of the vehicles that the operator has assisted. The task tracking system can generate one or more operator attributes based on the tracking data. The operator attributes can be provided as attribute data to an operator attribute database of the autonomous vehicle assistance system.

One or more vehicle interfaces of an operations computing system may receive a request from an autonomous vehicle for remote autonomous assistance with one or more autonomous computing system tasks at the autonomous computing system. The vehicle interface can pass the request and/or one or more request parameters to an operator selection system of the remote assistance system. The operator selection system can obtain the request and/or one or more request parameters from the vehicle interface. The one or more request parameters may be included with the request as received from the autonomy computing system, or may be derived from the request (e.g., by analyzing data included within the request). In some examples, a request for remote autonomous assistance may be received from a computing device separate from the autonomous vehicle. For example, a user of an autonomous vehicle service may send a request for assistance using a client device such as a smartphone, tablet, etc. A client device may initiate a telephone call to connect the user with the operations computing system. In some examples, the operations computing system can match a telephone number or other identifier with an existing vehicle service.

The operator selection system can access the operator attribute database to obtain operator attributes associated with the plurality of operators. The operator selection system can compare the request parameters with the operator attributes. For example, the operator selection system can determine whether a match exists between a particular request parameter and a corresponding operator attribute. In some examples, the operator selection system can generate scores for individual operator attributes based on whether there exists a match with a request parameter from the request. The operator selection system can generate an operator score based on combining the attribute scores associated with the operator. The attribute scores and/or operator score may be weighted based on time information. One or more time identifiers can be included as an operator attribute or may be associated with one or more operator attributes. For example, a timestamp may be included with an operator attribute to indicate a time that the operator attribute was generated based on an assisted autonomy task performed by the operator. In this manner, the operator attribute database can indicate how recently an operator had experience with a particular attribute such as a particular vehicle, vehicle type etc. The remote assistance system can apply a weight to one or more attribute scores based on a time identifier associated with the operator attribute. For example, the remote assistance system can apply a weight to an attribute score based on an elapsed time since the operator attribute was generated (e.g., when the corresponding assisted autonomy task was performed). The remote assistance system can combine the attribute scores (e.g., weighted attribute scores) for an operator to determine an operator score for each operator. In some examples, a time identifier can be used to apply a weight to an operator score to generate a weighted operator score.

The operator selection system can identify one or more operators to facilitate one or more assisted autonomy tasks in response to the request for remote assistance. The operator selection system can provide an identifier such as an operator identifier of the selected one or more operators to a remote assistance interface of the request assistance system. The remote assistance interface can facilitate one or more responses to the request for remote operator assistance using the one or more identified operators. For example, the remote interface system may receive sensor data from the autonomy computing system and provide the sensor data to the one or more selected operators. For example, the remote assistance interface system can generate one or more user interfaces to display the sensor data to the selected operator via one or more operator computing devices. By way of example, the remote assistance interface can provide imagery such as one or more images and/or video from an image sensor on board the autonomous vehicle (e.g., in at least near real-time while providing remote assistance). Additionally and/or alternatively, the remote assistance interface system may provide sensor data such as LIDAR, RADAR or any other suitable information. In some examples, an operator may request particular sensor data from an autonomous vehicle in order to facilitate an assisted autonomy task.

The operator may analyze the sensor data provided by the autonomy computing system in order to generate task management data using an operator computing device. The operator computing device can perform one or more assisted autonomy tasks and generate task management data. As a particular example, an autonomous vehicle may issue a request for assistance with classifying an object. An identified operator for facilitating one or more assisted autonomy tasks may view one or more images of the unclassified object. The identified operator can provide an input to an operator computing system identifying the unclassified object. For example, the operator may provide input indicating an identification of the unclassified object. The remote assistance system can generate a classification for the object. The classification of the object or other information may comprise task management data that is provided from the operator computing system to the remote assistance interface. The remote assistance interface can generate one or more control commands to the autonomy computing system of the autonomous vehicle including data indicative of the classification generated by the remote assistance system from the user input.

As another example, the identified operator may view sensor data and provide path assistance such as indication of a general path for the autonomous vehicle to travel within a geographical area. For example, the remote operator may provide an input to generate one or more points (e.g., location coordinates) through which the autonomous vehicle should travel. The one or more points and/or other data may comprise task management data that is provided from an operator computing system to the remote assistance interface. The remote assistance interface can generate one or more control commands including data indicative of the target vehicle path provided by the operator. The autonomy computing system of the autonomous vehicle can receive the path information and generate an appropriate motion plan to follow the identified path.

In some example embodiments, the request assistance system can identify one or more operators from a plurality of operators to facilitate assisted autonomy tasks in response to a request for remote assistance. For example, an operator selection system can first filter a list of the plurality of operators based on one or more pre-request criteria. For example, a list of operators may be filtered based on those currently online with the autonomous vehicle assistance system. Other information may be used to filter a list to develop a set of operators that will be compared. For each operator, an attribute score may be generated for a plurality of operator attributes. The attribute scores may be generated based on a comparison of each operator attribute with a corresponding one or more resource parameters from the request. For example, a resource parameter may identify a vehicle type which can be compared with an operator attribute indicating vehicle types associated with an operator. A resource parameter may identify a vehicle capability which can be compared with an operator attribute indicating vehicle capabilities with which the operator has experience. In some examples, one or more attribute scores may be modified based on a time associated with the corresponding operator attribute. The time may indicate a time of performance of one or more of the assisted autonomy tasks for which the operator attribute was generated. An operator score can be generated based on a combination of the one or more attribute scores generated for each operator. The operator score may identify an overall correspondence between a set of operator attributes and a set of resource parameters. The data may indicate a correlation or other correspondence between the operator attributes and the resource parameters. An operator score may be generated for each of the filtered set of operators. The operator scores can be compared to select one or more operators to facilitate one or more assisted autonomy tasks in response to the request for remote assistance. For example, an operator having a highest score or other indication of a high degree of correlation between operator attributes and resource parameters can be selected.

In accordance with some example embodiments, a computing system may include one or more computing devices that are configured to track assisted autonomy tasks that are facilitated by plurality of operators for a plurality of autonomous vehicles. The computing system can generate a plurality of operator attributes for each operator based on tracking the assisted autonomy tasks performed by such operator. Operator attributes can be stored in an operator attribute database or other data store in some examples. One or more resource parameters can be obtained in response to requests for remote autonomous vehicle assistance received by the computing system. The computing system can compare the operator attributes of each operator with the resource parameters for the request. The computing system can determine one or more operators from the plurality of operators that can facilitate one or more assisted autonomy tasks for the request based at least in part on operator attributes and the request parameters. The computing system may determine an operator having operator attributes that most closely match the resource parameters. The computing system can initiate one or more control actions such as transmitting control messages to the autonomy computing system to facilitate the remote autonomous vehicle assistance.

In some implementations, a user of an autonomous vehicle service can initiate a communication to an autonomous vehicle assistance system. The user in some instances may initiate a communication to the autonomous vehicle assistance system using a user computing device such as a smartphone or other computing device. The user may request assistance with a requested vehicle service. By way of example, a user of the autonomous vehicle (e.g., a rider of the vehicle for a transportation service) may discover an issue with the autonomous vehicle (e.g., broken equipment in the vehicle cabin) and/or the user may experience a problem (e.g., a medical issue). The user can provide user input to a user computing device (e.g., using a human-machine interface provided by the user computing device) to request assistance from the autonomous vehicle assistance system. For example, the user may place a phone call that is routed to the autonomous vehicle assistance system, may text a message to the autonomous vehicle assistance system, or may provide input via an application or other computer program provided by the service entity or vehicle vendor, etc. In some examples, a telephone call can be matched with a vehicle service, such as by matching a telephone number of the incoming call with a telephone number included in a service record. Other techniques can be used to determine a vehicle service corresponding to a telephone call. For instance, the operations computing system may receive identifying information from a user via the phone (e.g., by audible commands or input actions).

In response, the autonomous vehicle assistance system can communicate with the autonomous vehicle to address the issue. For example, a human operator associated with the autonomous vehicle assistance system can participate in a video conference with the user of the autonomous vehicle via an onboard computing device including a human-machine interface. This can allow the human operator to comfort the user as well as work to address the issue discovered by and/or experienced by the user. In other examples, the autonomous vehicle assistance system may send assistance data that can be presented to the user via the human-machine interface of the onboard computing device. The AV assistance system can send control messages to the autonomous vehicle in response to a telephone call in some examples. For example, the selected operator may be connected with a vehicle service associated with a user in response to a telephone call. The selected operator may view sensor data provided by the autonomous vehicle in response to the telephone call. The selected operator can provide input to the operations computing system which can generate one or more control commands to the autonomous vehicle.

According to some example implementations, the autonomous vehicle assistance system may receive a communication from a first user computing device associated with a request for assistance with an autonomous vehicle service. The communication can be received via a request interface of the computing system configured to communicate with user computing devices. The autonomous vehicle assistance system can determine an autonomous vehicle corresponding to the autonomous vehicle service based at least in part on the communication from the first user computing device. For example, the autonomous vehicle assistance system may obtain a vehicle service record based on a phone number or other identifier included with the request. The autonomous vehicle assistance system can generate assistance data in response to the request for assistance with the autonomous vehicle service. The autonomous vehicle assistance system can transmit one or more control messages via a vehicle interface of the computing system to an onboard computing device physically coupled to the autonomous vehicle. The one or more control messages can include the assistance data. The onboard computing device can be configured to generate one or more graphical user interfaces for a display of the onboard computing device in response to the one or more control messages. The one or more graphical user interfaces can include at least one graphical element based at on the assistance data.

The systems and methods described herein provide a number of technical effects and benefits. More particularly, the systems and methods of the present disclosure provide improved techniques for the efficient performance of assisted autonomy tasks by computing systems remote from autonomous vehicles. By tracking assisted autonomy tasks, generating operator attributes, and utilizing request parameters in order to select operators for particular remote assistance requests, the amount of computational resources utilized in assisting an autonomy computing system with autonomous computing tasks can be reduced. For instance, as described herein, a remote autonomous vehicle assistance computing system can track assisted autonomy tasks performed by the autonomous vehicle assistance computing system. The assisted autonomy tasks can be facilitated by a plurality of operators including human operators and/or computer-based operators. The autonomous vehicle assistance system can generate operator attributes for individual operators based on tracking assisted autonomy tasks. Request parameters can be determined from future requests for remote operator assistance received by the autonomous vehicle assistance system. The autonomous vehicle assistance system can determine request parameters associated with the requests for autonomous vehicle assistance. The request parameters can be compared with the operator attributes so that an operator having experience or familiarity associated with the request parameters can be selected to facilitate assisted autonomy tasks in response to the request for autonomous vehicle assistance. By correlating operator attributes and request parameters, a remote operator can be selected that is more likely to be able to assist with a request for remote operator assistance. This can minimize downtime where the autonomy computing system of an autonomous vehicle remains idle and is unable to provide vehicle services. Such examples represent a waste of computer resources and/or bandwidth. By more precisely correlating requests for autonomous vehicle assistance with operators, the amount of computing resources and bandwidth required for systems can be reduced. Such techniques may provide a better user experience by reducing the amount of time that an autonomous vehicle remains idle. Moreover, such solutions can alleviate congestion within geographical areas that may be associated with a non-moving vehicle or a vehicle not efficiently proceeding along a route.

Example aspects of the present disclosure can provide an improvement to vehicle computing technology, such as autonomous vehicle computing technology. For instance, the systems and methods of the present disclosure provide an improved autonomous computing system that can request remote assistance from a remote autonomous vehicle assistance system. In some examples, the autonomous computing system can be configured to transmit resource parameters or data from which resource parameters can be derived when sending a request for autonomous vehicle assistance to an autonomous vehicle assistance system. In this manner, the autonomous vehicle assistance system can more accurately determine one or more human or machine-based operators to facilitate assisted autonomy tasks. Moreover, assisted autonomy tasks can be more readily identified in response to requests including such resource parameters. In this manner, the autonomous computing system can more quickly receive information such as data generated in response to an assisted autonomy task performed by a remote computing system. The data can be used by the autonomy computing system to complete autonomous computing system tasks at the autonomous vehicle. In this manner, the autonomous vehicle can more efficiently navigate within a geographical area by more quickly receiving data to resolve autonomous computing tasks that may otherwise slow service.

Various means can be configured to perform the methods and processes described herein. For example, a computing system can include tracking unit(s), data generation unit(s), data obtaining unit(s), operation determination unit(s), remote autonomous vehicle (AV) assistance unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to track a plurality of assisted autonomy tasks facilitated by a plurality of operators for a plurality of autonomous vehicles. For example, the means can be configured to generate tracking data indicative of information associated with the plurality of assisted autonomy tasks facilitated by the operators. A tracking unit is one example of a means for tracking a plurality of assisted autonomy tasks facilitated by plurality of operators for a plurality of autonomous vehicles as described herein.

The means can be configured to generate a respective plurality of operator attributes for each operator of the plurality of operators based on tracking one or more respective assisted autonomy tasks facilitated by such operator. For example, the means can be configured to generate operator attributes including data associated with at least the one or more respective assisted autonomy tasks facilitated by such operator. Operator attributes may include, but are not limited to, location(s) associated with respective assisted autonomy task(s), vehicles associated with respective assisted autonomy task(s), vehicle type(s) associated with respective assisted autonomy task(s), vendor(s) associated with respective assisted autonomy tasks, and assistance types associated with respective assisted autonomy task(s). A data generation unit is one example of a means for generating a respective plurality of operator attributes for each operator of the plurality of operators based on tracking one or more respective assisted autonomy tasks facilitated by such operator as described herein.

The means can be configured to obtain one or more request parameters associated with the request for remote autonomous vehicle assistance from a first autonomous vehicle of the plurality of autonomous vehicles. For example, the means can be configured to obtain request parameters such as data indicative of a location of an autonomous vehicle requesting assistance, an identification of the autonomous vehicle, a type of the autonomous vehicle, a vendor of the first autonomous vehicle, or an assistance type associated with the request for remote autonomous vehicle assistance. A data obtaining unit is one example of a means for obtaining one or more request parameters associated with the request for remote autonomous vehicle assistance from a first autonomous vehicle of the plurality of autonomous vehicles as described herein.

The means can be configured to determine a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance. For example, the means can be configured to compare the one or more request parameters with the operator attributes associated with the plurality of operators. Means can be configured to generate attribute scores, operator scores, as well as to wait attribute scores in our operator scores. The attribute scores and or operator scores can be used to identify a first operator having a set of operator attributes the most closely match the request parameters. An operator determination unit is one example of a means for determining a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance as described herein.

The means can be configured to initiate remote autonomous vehicle assistance for the first autonomous vehicle facilitated by the first operator in response to the request for remote autonomous vehicle assistance. For example, the means can be configured to send a message to an operator that it has been assigned to a particular request for remote autonomous vehicle assistance. The means can be configured to sensor data from the autonomous vehicle to an operator computing system associated with the selected operator. A remote autonomous vehicle (AV) assistance unit is one example of a means for initiating remote autonomous vehicle assistance for the first autonomous vehicle facilitated by the first operator in response to the request for remote autonomous vehicle assistance as described herein.

FIG. 1 depicts a block diagram of an example vehicle computing system 100 for controlling the navigation of a vehicle according to example embodiments of the present disclosure. As illustrated, FIG. 1 shows a vehicle computing system 100 that can include a vehicle 105, a communication system 120, one or more sensors 125, autonomy system sensor data 140, a positioning system 150, an autonomy computing system 130, map data 145, a perception system 155, a prediction system 160, a motion planning system 165, perception data 170, prediction data 175, motion plan data 180, and a vehicle control system 135.

The vehicle computing system 100 can be associated with a service provider that can provide one or more vehicle services to a plurality of users via a fleet of vehicles that includes, for example, the vehicle 105. The vehicle services can include transportation services (e.g., rideshare services), courier services, delivery services, and/or other types of services.

The vehicle computing system 100 can include multiple components for performing various operations and functions. For example, the vehicle computing system 100 can include and/or otherwise be associated with one or more computing devices that are remote from the vehicle 105. The one or more computing devices of the vehicle computing system 100 can include one or more processors and one or more memory devices. The one or more memory devices of the vehicle computing system 100 can store instructions that when executed by the one or more processors cause the one or more processors to perform operations and functions associated with operation of one or more vehicles (e.g., a fleet of vehicles), with the provision of vehicle services, and/or other operations as discussed herein.

The vehicle computing system 100 can communicate with the one or more remote computing devices via one or more communications networks including a communications network. The communications network can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network can include a local area network (e.g. intranet), a wide area network (e.g. Internet), a wireless LAN network (e.g., via Wi-Fi), a cellular network, a SATCOM network, a VHF network, a HF network, a WiMAX based network, and/or any other suitable communications network (or combination thereof) for transmitting data to and/or from the vehicle 105.

The vehicle 105 can be a ground-based vehicle (e.g., an automobile), an aircraft, and/or another type of vehicle. The vehicle 105 can be an autonomous vehicle that can perform various actions including driving, navigating, and/or operating, with minimal and/or no interaction from a human driver. The autonomous vehicle 105 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 105 can provide driving and navigational operation with minimal and/or no interaction from a human driver present in the vehicle. A semi-autonomous operational mode can be one in which the vehicle 105 can operate with some interaction from a human driver present in the vehicle. Park and/or sleep modes can be used between operational modes while the vehicle 105 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 105. Additionally, the vehicle 105 can provide data indicative of the state of the vehicle, the state of one or more passengers of the vehicle, and/or the state of an environment to the vehicle services system, which can store an indication, record, and/or other data indicative of the state of the one or more objects within a predefined distance of the vehicle 105 in one or more memory devices associated with the vehicle services system (e.g., remote from the vehicle). Furthermore, the vehicle 105 can provide data indicative of the state of the one or more objects (e.g., physical dimensions and/or appearance of the one or more objects) within a predefined distance of the vehicle 105 to the vehicle services system, which can store an indication, record, and/or other data indicative of the state of the one or more objects within a predefined distance of the vehicle 105 in one or more memory devices associated with the vehicle services system (e.g., remote from the vehicle).

The vehicle 105 can include and/or be associated with the vehicle computing system 100. The vehicle computing system 100 can include one or more computing devices located onboard the vehicle 105. For example, the one or more computing devices of the vehicle computing system 100 can be located on and/or within the vehicle 105. The one or more computing devices of the vehicle computing system 100 can include various components for performing various operations and functions. For instance, the one or more computing devices of the vehicle computing system 100 can include one or more processors and one or more tangible, non-transitory, computer readable media (e.g., memory devices). The one or more tangible, non-transitory, computer readable media can store instructions that when executed by the one or more processors cause the vehicle 105 (e.g., its computing system, one or more processors, and other devices in the vehicle 105) to perform operations and functions, including those described herein.

As depicted in FIG. 1, the vehicle computing system 100 can include the one or more sensors 125, a positioning system 150, an autonomy computing system 130, a communication system 120, and a vehicle control system 135. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more system sensors 125 can be configured to generate and/or store data including the sensor data 140 associated with one or more objects that are proximate to the vehicle 105 (e.g., within range or a field of view of one or more of the one or more sensors 125). The one or more autonomy system sensors 125 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The sensor data 140 can include image data, radar data, LIDAR data, and/or other data acquired by the one or more sensors 125. The one or more objects can include, for example, pedestrians, vehicles, bicycles, and/or other objects. The one or more sensors can be located on various parts of the vehicle 105 including a front side, rear side, left side, right side, top, or bottom of the vehicle 105. The sensor data 140 can be indicative of locations associated with the one or more objects within the surrounding environment of the vehicle 105 at one or more times. For example, sensor data 140 can be indicative of one or more LIDAR point clouds associated with the one or more objects within the surrounding environment. The one or more sensors 125 can provide the sensor data 140 to the autonomy computing system 130.

In addition to the sensor data 140, the autonomy computing system 130 can retrieve or otherwise obtain data including the map data 145. The map data 145 can provide detailed information about the surrounding environment of the vehicle 105. For example, the map data 145 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 100 in processing, analyzing, and perceiving its surrounding environment and its relationship thereto.

The vehicle computing system 100 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 105 can be used by various systems of the vehicle computing system 100 and/or provided to one or more remote computing devices. For example, the map data 145 can provide the vehicle 105 relative positions of the surrounding environment of the vehicle 105. The vehicle 105 can identify its position within the surrounding environment (e.g., across six axes) based at least in part on the data described herein. For example, the vehicle 105 can process the sensor data 140 (e.g., LIDAR data, camera data) to match it to a map of the surrounding environment to get an understanding of the vehicle's position within that environment (e.g., transpose the vehicle's position within its surrounding environment).

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can receive the sensor data 140 from the one or more sensors 125, attempt to determine the state of the surrounding environment by performing various processing techniques on the sensor data 140 (and/or other data), and generate an appropriate motion plan through the surrounding environment. The autonomy computing system 130 can control the one or more vehicle control systems 135 to operate the vehicle 105 according to the motion plan.

The perception system 155 can identify one or more objects that are proximate to the vehicle 105 based on sensor data 140 received from the sensors 125. In particular, in some implementations, the perception system 155 can determine, for each object, perception data 170 that describes a current state of such object. As examples, the perception data 170 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 155 can determine perception data 170 for each object over a number of iterations. In particular, the perception system 155 can update the perception data 170 for each object at each iteration. Thus, the perception system 155 can detect and track objects (e.g., vehicles, bicycles, pedestrians, etc.) that are proximate to the vehicle 105 over time, and thereby produce a presentation of the world around a vehicle 105 along with its state (e.g., a presentation of the objects of interest within a scene at the current time along with the states of the objects).

The prediction system 160 can receive the perception data 170 from the perception system 155 and predict one or more future locations and/or moving paths for each object based on such state data. For example, the prediction system 160 can generate prediction data 175 associated with each of the respective one or more objects proximate to the vehicle 105. The prediction data 175 can be indicative of one or more predicted future locations of each respective object. The prediction data 175 can be indicative of a predicted path (e.g., predicted trajectory) of at least one object within the surrounding environment of the vehicle 105. For example, the predicted path (e.g., trajectory) can indicate a path along which the respective object is predicted to travel over time (and/or the velocity at which the object is predicted to travel along the predicted path). The prediction system 160 can provide the prediction data 175 associated with the one or more objects to the motion planning system 165.

The motion planning system 165 can determine a motion plan and generate motion plan data 180 for the vehicle 105 based at least in part on the prediction data 175 (and/or other data). The motion plan data 180 can include vehicle actions with respect to the objects proximate to the vehicle 105 as well as the predicted movements. For instance, the motion planning system 165 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 180. By way of example, the motion planning system 165 can determine that the vehicle 105 can perform a certain action (e.g., pass an object) without increasing the potential risk to the vehicle 105 and/or violating any traffic laws (e.g., speed limits, lane boundaries, signage). The motion plan data 180 can include a planned trajectory, velocity, acceleration, and/or other actions of the vehicle 105.

As one example, in some implementations, the motion planning system 165 can determine a cost function for each of one or more candidate motion plans for the autonomous vehicle 105 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 105 approaches impact with another object and/or deviates from a preferred pathway (e.g., a predetermined travel route).

Thus, given information about the current locations and/or predicted future locations and/or moving paths of objects, the motion planning system 165 can determine a cost of adhering to a particular candidate pathway. The motion planning system 165 can select or determine a motion plan for the autonomous vehicle 105 based at least in part on the cost function(s). For example, the motion plan that minimizes the cost function can be selected or otherwise determined. The motion planning system 165 then can provide the selected motion plan to a vehicle controller that controls one or more vehicle controls (e.g., actuators or other devices that control gas flow, steering, braking, etc.) to execute the selected motion plan.

The motion planning system 165 can provide the motion plan data 180 with data indicative of the vehicle actions, a planned trajectory, and/or other operating parameters to the vehicle control systems 135 to implement the motion plan data 180 for the vehicle 105. For instance, the vehicle 105 can include a mobility controller configured to translate the motion plan data 180 into instructions. By way of example, the mobility controller can translate a determined motion plan data 180 into instructions for controlling the vehicle 105 including adjusting the steering of the vehicle 105 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 180.

The vehicle computing system 100 can include a communications system 120 configured to allow the vehicle computing system 100 (and its one or more computing devices) to communicate with other computing devices. The vehicle computing system 100 can use the communications system 120 to communicate with the operations computing system 104 and/or one or more other remote computing devices (e.g., the one or more remote computing devices 106) over one or more networks (e.g., via one or more wireless signal connections, etc.). In some implementations, the communications system 120 can allow communication among one or more of the system on-board the vehicle 105. The communications system 120 can also be configured to enable the autonomous vehicle to communicate with and/or provide and/or receive data and/or signals from a remote computing device 106 associated with a user and/or an item (e.g., an item to be picked-up for a courier service). The communications system 120 can utilize various communication technologies including, for example, radio frequency signaling and/or Bluetooth low energy protocol. The communications system 120 can include any suitable components for interfacing with one or more networks, including, for example, one or more: transmitters, receivers, ports, controllers, antennas, and/or other suitable components that can help facilitate communication. In some implementations, the communications system 120 can include a plurality of components (e.g., antennas, transmitters, and/or receivers) that allow it to implement and utilize multiple-input, multiple-output (MIMO) technology and communication techniques.

The vehicle computing system 100 can include the one or more human-machine interfaces. For example, the vehicle computing system 100 can include one or more display devices located on the vehicle computing system 112. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat).

Figure 2:
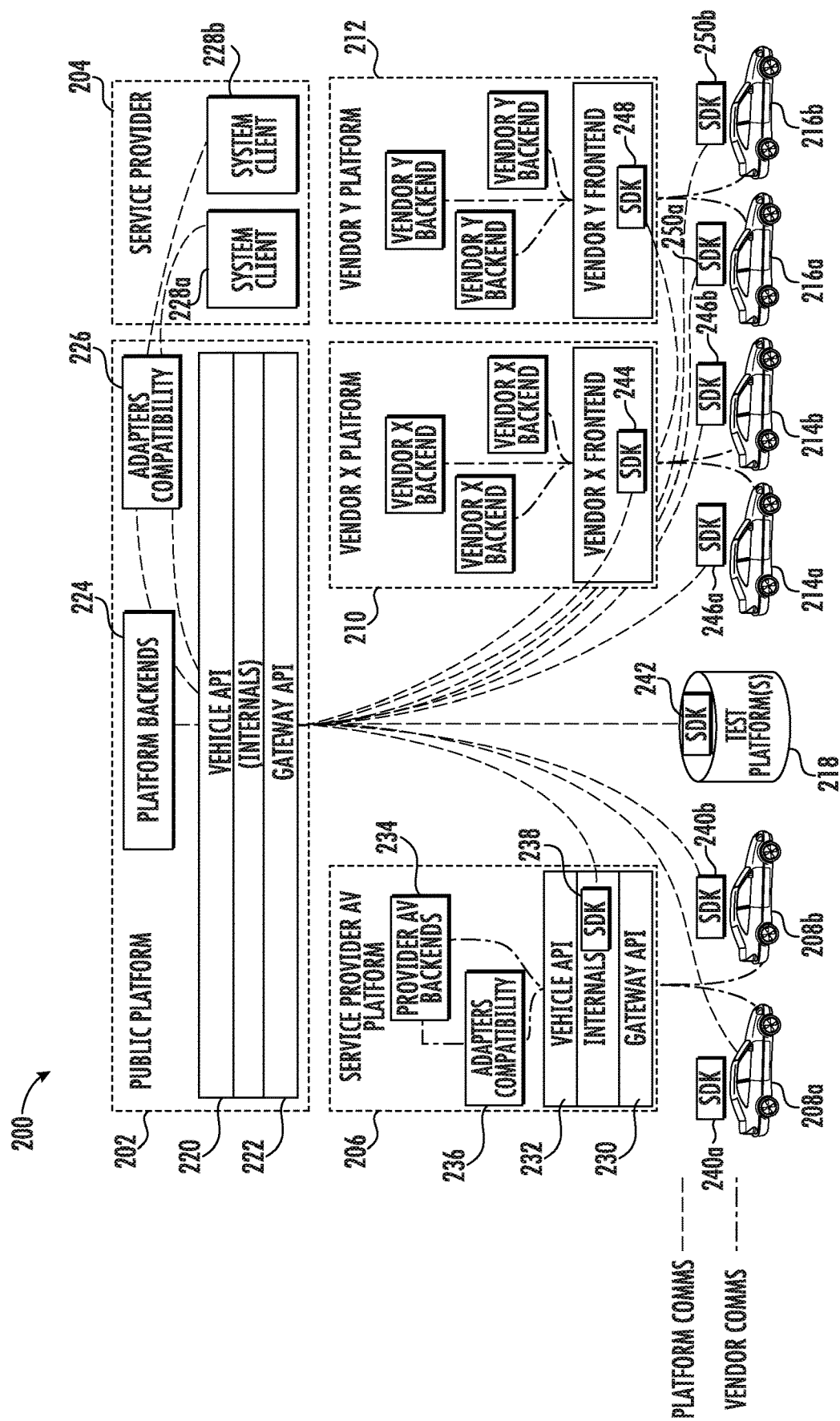
FIG. 2 depicts an example infrastructure system according to example embodiments of the present disclosure.

FIG. 2 depicts an example service infrastructure 200 according to example embodiments of the present disclosure. As illustrated in FIG. 2, an example service infrastructure 200, according to example embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208*a* and 208*b*, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214*a*, 214*b*, 216*a*, and 216*b*. In some implementations, the VIP component described herein can include one or more of the platforms and related components illustrated in the service infrastructure 200 of FIG. 2.

As described herein, a service infrastructure 200 can include a public platform 202 to facilitate vehicle services (e.g., provided via one or more system clients (228*a*, 228*b*) associated with a service provider operations computing system) between the service provider system 204 (e.g., operations computing system, etc.) and vehicles associated with one or more entities (e.g., associated with the service provider (208*a*, 208*b*), associated with third-party entities (214*a*, 214*b*, 216*a*, 216*b*), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular back-end interface. An autonomous vehicle can provide a communication to the public platform 202 to call a function of a backend interface. In this way, the backend interfaces can be an external facing edge of the service provider system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to which to provide access.

Figure 3:
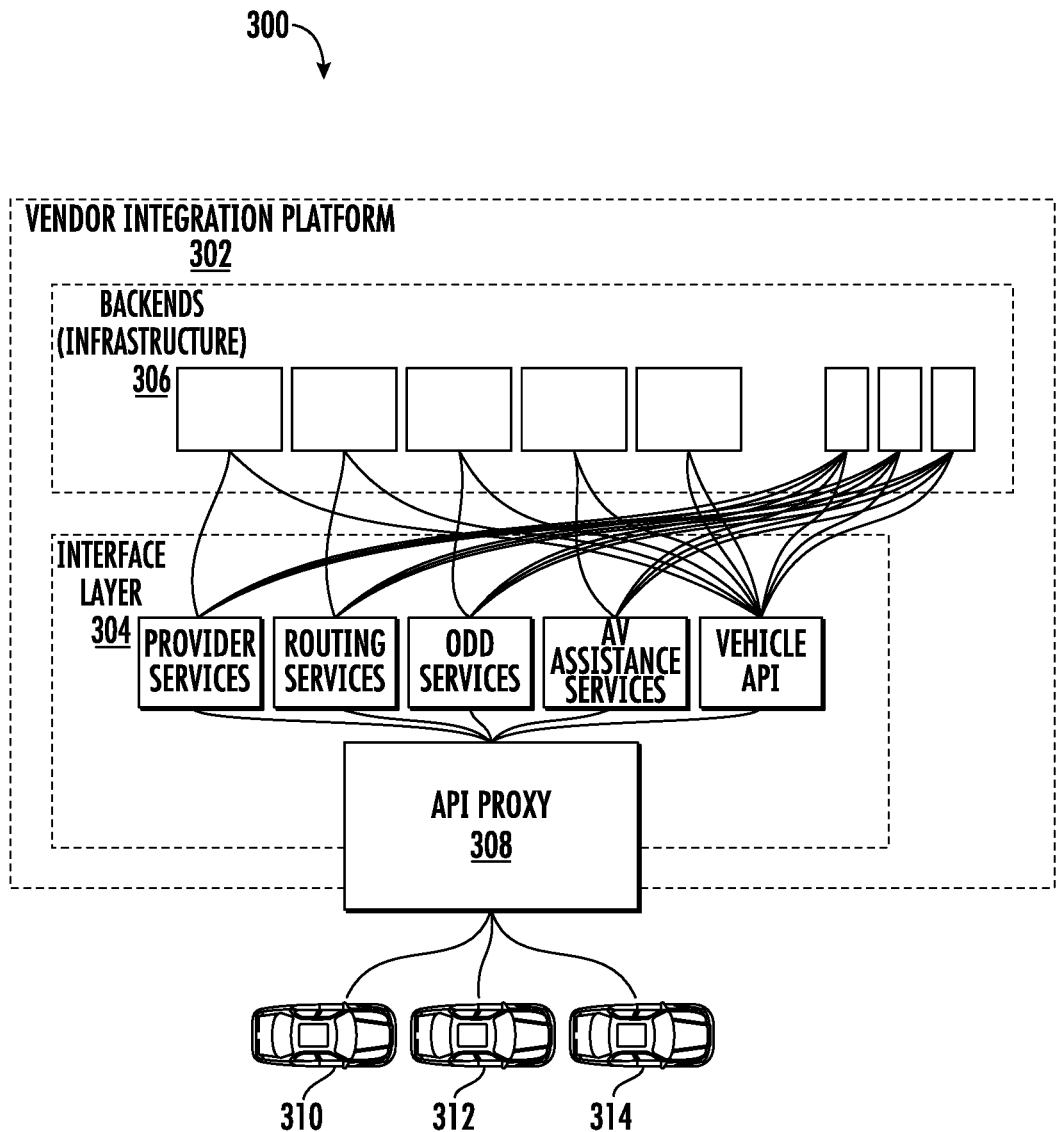
FIG. 3 depicts an example of a multiple entity integration platform according to example embodiments of the present disclosure.

FIG. 3 depicts an example of an entity integration platform 300 according to example embodiments of the present disclosure. As illustrated in FIG. 3, an entity integration platform 300 can include a vendor integration platform (e.g., public platform) 302 in communication with one or more vehicles, such as autonomous vehicles 310, 312, and 314. As described in regard to FIG. 2, the public platform 302 can provide for communication between a plurality of backend services 306 and one or more autonomous vehicles (e.g., 310, 312, and/or 314) via a plurality of interfaces 304. As such, public platform 302 of FIG. 3 can in some embodiments correspond to public platform 202 of FIG. 2, while backend services 306 and/or interfaces 304 of FIG. 3 can in some embodiments correspond to backend interfaces 224 of FIG. 2 and corresponding applications, interfaces, and the like. In some implementations, the public platform 302 can include application programming interface (API) proxy 308 to act as a central gateway to the public platform 302 for communications to/from the autonomous vehicles. In some embodiments, an autonomous vehicle (e.g., 310, 312, and/or 314) can communicate with the API proxy 308 via an SDK associated with the autonomous vehicle, as described herein.

Figure 4:
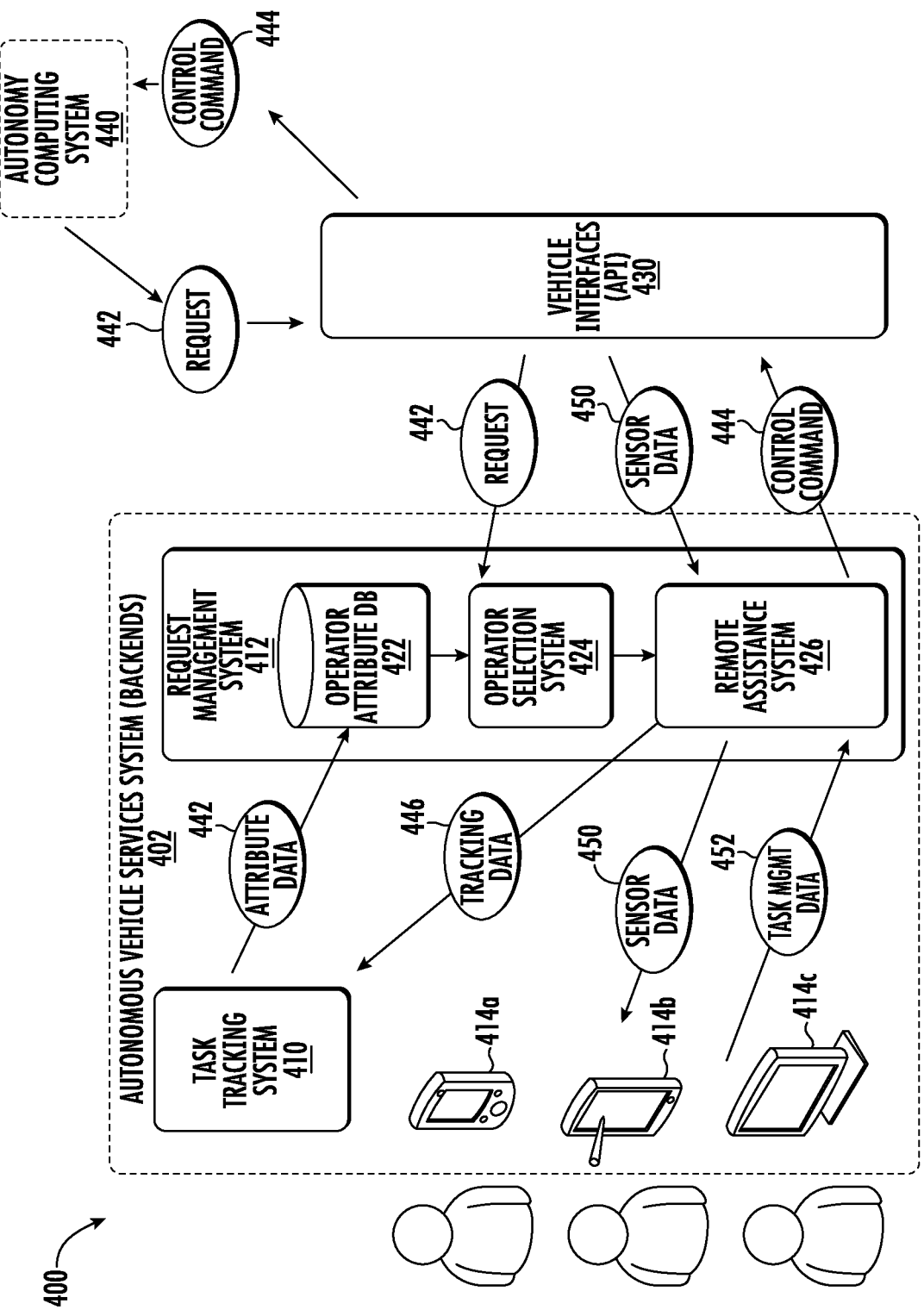
FIG. 4 depicts an example computing system for providing remote autonomous vehicle assistance to autonomous vehicles according to example embodiments of the present disclosure.

FIG. 4 depicts an example computing system 400 for providing remote autonomous vehicle assistance to autonomous vehicles according to example embodiments of the present disclosure. The computer system 400 can include an autonomous vehicle system 402, one or more vehicle interfaces 430 (e.g., API(s)), and one or more autonomy computing systems 440. The autonomous vehicle system 402 can include a request management system 412, a task tracking system 410, and one or more operator devices (e.g., operator devices 414a, 414b, and 414c).

The request management system 412 can be configured to process requests 442 for remote assistance and generate one or more control commands 444 for an autonomous computing system 440 of an autonomous vehicle in response to the requests 442. The task tracking system 410 can generate operator attributes based on tracking the performance of assisted autonomy tasks by the plurality of operators. In some examples, a remote assistance interface 426 may provide tracking data to the task tracking system 410. The tracking data 446 may identify an operator and one or more assisted autonomy tasks performed by the operator. The tracking data 446 may include data indicative of a particular vehicle, vehicle type, geographic area, time, and/or assistance type associated with the assisted autonomy task. In some implementations, the tracking data 446 may be indicative of the capabilities (e.g., ability to travel in snowfall, make unprotected lefts, make U-turns, etc.) or lack thereof of the vehicles that the operator has assisted. The task tracking system 410 can generate one or more operator attributes based on the tracking data 446. The operator attributes can be provided as attribute data 448 to an operator attribute database 422 of the autonomous vehicle assistance system 402.

One or more vehicle interfaces 430 (e.g., an API available to the autonomy computing system 440) of an operations computing system may receive a request 442 from an autonomous vehicle for remote autonomous assistance with one or more autonomous computing system 440 tasks at the autonomous computing system 440. The vehicle interface 430 can pass the request 442 and/or one or more request parameters to an operator selection system 424 of the request management system 412. The operator selection system 424 can obtain the request 442 and/or one or more request parameters from the vehicle interface 430. The one or more request parameters may be included with the request 442 as received from the autonomy computing system 440 or may be derived from the request 442 (e.g., by analyzing data included within the request). In some examples, a request 442 for remote autonomous vehicle assistance may be received from a computing device separate from the autonomous vehicle. For example, a user of an autonomous vehicle service may send a request 442 for autonomous vehicle assistance using a client device such as a smartphone, tablet, etc. A client device may initiate a telephone call to connect the user with an operations computing system. In some examples, an operations computing system associated with the autonomous vehicle services system 440 can match a telephone number or other identifier with an existing vehicle service.

The operator selection system 424 can access the operator attribute database 422 to obtain operator attributes associated with the plurality of operators. The operator selection system 422 can compare the request parameters with the operator attributes. For example, the operator selection system 424 can determine whether a correspondence or match exists between a particular request parameter and a corresponding operator attribute. In some examples, the operator selection system 424 can generate scores for individual operator attributes based on whether there exists a match with a request parameter from the request. The operator selection system 424 can generate an operator score based on combining the attribute scores associated with the operator. The attribute scores and/or operator score may be weighted based on time information. One or more time identifiers can be included as an operator attribute or may be associated with one or more operator attributes. For example, a timestamp may be included with an operator attribute to indicate a time that the operator attribute was generated based on an assisted autonomy task performed by the operator. In this manner, the operator attribute database 422 can indicate how recently an operator had experience with a particular attribute such as a particular vehicle, vehicle type etc. The remote assistance system 426 can apply a weight to one or more attribute scores based on a time identifier associated with the operator attribute. For example, the remote assistance system 426 can apply a weight to an attribute score based on an elapsed time since the operator attribute was generated (e.g., when the corresponding assisted autonomy task was performed). The remote assistance system 426 can combine the attribute scores (e.g., weighted attribute scores) for an operator to determine an operator score for each operator. In some examples, a time identifier can be used to apply a weight to an operator score to generate a weighted operator score.

The operator selection system can identify one or more operators to facilitate one or more assisted autonomy tasks in response to the request for remote assistance. The operator selection system 424 can provide an identifier such as an operator identifier of the selected one or more operators to a remote assistance interface of the remote assistance system 426. The remote assistance system 426 can provide an interface that can facilitate one or more responses to the request for remote operator assistance using the one or more identified operators. For example, the remote assistance system 426 may receive sensor data 450 from the autonomy computing system and provide the sensor data 450 to the one or more selected operators. For example, the remote assistance system 426 can generate one or more user interfaces to display the sensor data 450 to the selected operator via one or more operator computing devices (414a, 414b, and 414c). By way of example, the remote assistance interface can provide imagery such as one or more images and/or video from an image sensor on board the autonomous vehicle (e.g., in at least near real-time while providing remote assistance). Additionally and/or alternatively, the remote assistance system 426 may provide sensor data such as LIDAR, RADAR or any other suitable information. In some examples, an operator may request particular sensor data 450 from an autonomous vehicle in order to facilitate an assisted autonomy task.

The operator may analyze the sensor data 450 provided by the autonomy computing system 440 in order to generate task management data 452 using an operator computing device (e.g., one of 414a, 414b, and 414c). The operator computing device (e.g., one of 414a, 414b, and 414c) can perform one or more assisted autonomy tasks and generate task management data 452. As a particular example, an autonomous vehicle may issue a request 442 for assistance with classifying an object. An identified operator for facilitating one or more assisted autonomy tasks may view one or more images of the unclassified object. The identified operator can provide an input to an operator computing system (e.g., one of 414a, 414b, and 414c) identifying the unclassified object. For example, the operator may provide input indicating an identification of the unclassified object. The remote assistance system 426 can generate a classification for the object. The classification of the object or other information may comprise task management data 452 that is provided from the operator computing system (e.g., 414a, 414b, or 414c) to the remote assistance system 426. The remote assistance system 426 can generate one or more control commands 444 (herein also referred to as control messages) to the autonomy computing system 440 of the autonomous vehicle including data indicative of the classification generated by the remote assistance system 426 from the user input.

As another example, the identified operator may view sensor data 450 and provide path assistance such as indication of a general path for the autonomous vehicle to travel within a geographical area. For example, the remote operator may provide an input to generate one or more points (e.g., location coordinates) through which the autonomous vehicle should travel. The one or more points and/or other data may comprise task management data 452 that is provided from an operator computing system (e.g., one of 414a, 414b, and 414c) to the remote assistance system 426. The remote assistance system 426 can generate one or more control commands 444 including data indicative of the target vehicle path provided by the operator. The autonomy computing system 440 of the autonomous vehicle can receive the path information and generate an appropriate motion plan to follow the identified path.

In some example embodiments, the remote assistance system 426 can identify one or more operators from a plurality of operators to facilitate assisted autonomy tasks in response to a request for remote assistance. For example, an operator selection system 424 can first filter a list of the plurality of operators based on one or more pre-request criteria. For example, a list of operators may be filtered based on those currently online with the autonomous vehicle assistance system 402. Other information may be used to filter a list to develop a set of operators that will be compared. For each operator, an attribute score may be generated for a plurality of operator attributes. The attribute scores may be generated based on a comparison of each operator attribute with a corresponding one or more resource parameters from the request. For example, a resource parameter may identify a vehicle type which can be compared with an operator attribute indicating vehicle types associated with an operator. A resource parameter may identify a vehicle capability which can be compared with an operator attribute indicating vehicle capabilities with which the operator has experience. In some examples, one or more attribute scores may be modified based on a time associated with the corresponding operator attribute. The time may indicate a time of performance of one or more of the assisted autonomy tasks for which the operator attribute was generated. An operator score can be generated based on a combination of the one or more attribute scores generated for each operator. The operator score may identify an overall correspondence between a set of operator attributes and a set of resource parameters. The data may indicate a correlation or other correspondence between the operator attributes and the resource parameters. An operator score may be generated for each of the filtered set of operators. The operator scores can be compared to select one or more operators to facilitate one or more assisted autonomy tasks in response to the request for remote assistance. For example, an operator having a highest score or other indication of a high degree of correlation between operator attributes and resource parameters can be selected.

FIG. 5 depicts an example data structure including operator attributes according to example embodiments of the present disclosure. In accordance with some implementations, the operator attribute database (e.g., see operator attribute database 422 in FIG. 4) includes a plurality of operator attribute records (e.g., 502, 504, and 506). Each operator attribute record can store a set of operator attributes that describe a particular request for remote assistance. In this example, the operator attribute records include an operator ID 510, a timestamp 512, one or more locations identified by location data 514, an identifier 516 for an autonomous vehicle, a vehicle type 518 associated with the autonomous vehicle, a vendor 520 associated with the autonomous vehicle, a task type 522, and one or more vehicle capabilities 524.

In some example implementations, the operator ID 510 can be associated with a specific operator. Using this value, the task tracking system (e.g., 410 in FIG. 4) can associate the operator attribute record with a particular operator. Thus, operator attribute records 502 and 504 both list "Operator A" as the operator ID 510 and thus, both are associated with the same operator. In contrast, operator attribute record 506 lists "Operator B" as the operator ID 510 and is thus associated with a different operator. Thus, the operator ID 510 can be used to group operator attribute records that are associated with the same operator. The timestamp 512 can represent the time that the request for remote assistance was received. The timestamp 512 can also represent a time of performance of one or more of the assisted autonomy tasks for which the operator attribute record was generated. The location data 514 can represent the geographic location of the autonomous vehicle at the time of the request for remote assistance or the location of the device used to contact the system.

The vehicle identifier 516 can include a value that uniquely identifies a particular autonomous vehicle that has previously been registered with the autonomous vehicle assistance system (e.g., AV assistance system 402 in FIG. 4). Using this vehicle identifier 516, other information can be retrieved for that vehicle including the vehicle type 518, the vendor 520 associated with the vehicle, and the vehicle capabilities 524.

In some example embodiments, the vehicle type 518 represents the specific type of vehicle from a variety of vehicle types. In other example embodiments, the vehicle type 518 represents the make and model of the autonomous vehicle. The vendor 520 can represent the specific owner or operator of the associated autonomous vehicle. As noted above, a remote assistance system (e.g., system 126 in FIG. 4) may provide remote assistance for autonomous vehicles operated directly by a service entity and/or autonomous vehicles operated by third-parties that provide vehicle services under the control of the service entity. The vendor 520 can indicate which of either the service entity or the third party owns or operates the autonomous vehicle.

In some implementations, the task type 522 represents the specific task requested by the request for remote assistance. For example, the specific task can include identifying an object state, classified an object, dealing with a road obstruction, and so on. By way of example, an autonomy computing system may request remote autonomous assistance for autonomous computing tasks such as object classification, object prediction, mapping, motion planning, vehicle status checks, etc. For instance, the autonomy computing system may request remote assistance with an object that is unable to classify. Other examples of requests for remote assistance may include status checks such as the vehicle requesting assistance with identifying whether the vehicle is occupied or unoccupied, or whether the vehicle is suitable to perform a vehicle service. The vehicle capabilities 524 can include a list of capabilities associated with the autonomous vehicle. The vehicle capabilities can represent the particular tasks that the vehicle can perform.

FIG. 6 depicts an example data structure including request parameters according to example embodiments of the present disclosure. This data structure can include data from a request for remote assistance from an autonomous vehicle to an autonomous vehicle assistance system (e.g., AV assistance system 402 in FIG. 4). This data structure may also include data derived from a request for remote assistance. The data stored in the request records can be used by the operator selection system 424 (e.g., operator selection system 424 in FIG. 4) to match the request to a specific operator based on data in the operator attribute database 422.

The request records (602, 604, and 606) include a plurality of request parameters including a request ID 610, a time stamp 612, a location 614, a vehicle 616, vehicle type 618, a vendor 616, a task type 622, and a list of vehicle capabilities 624. In some examples, request parameters can be derived from a request such as by determining a vendor, vehicle type, list of vehicle capabilities from a database or other record store based on a vehicle identifier or other information.

Figure 7:
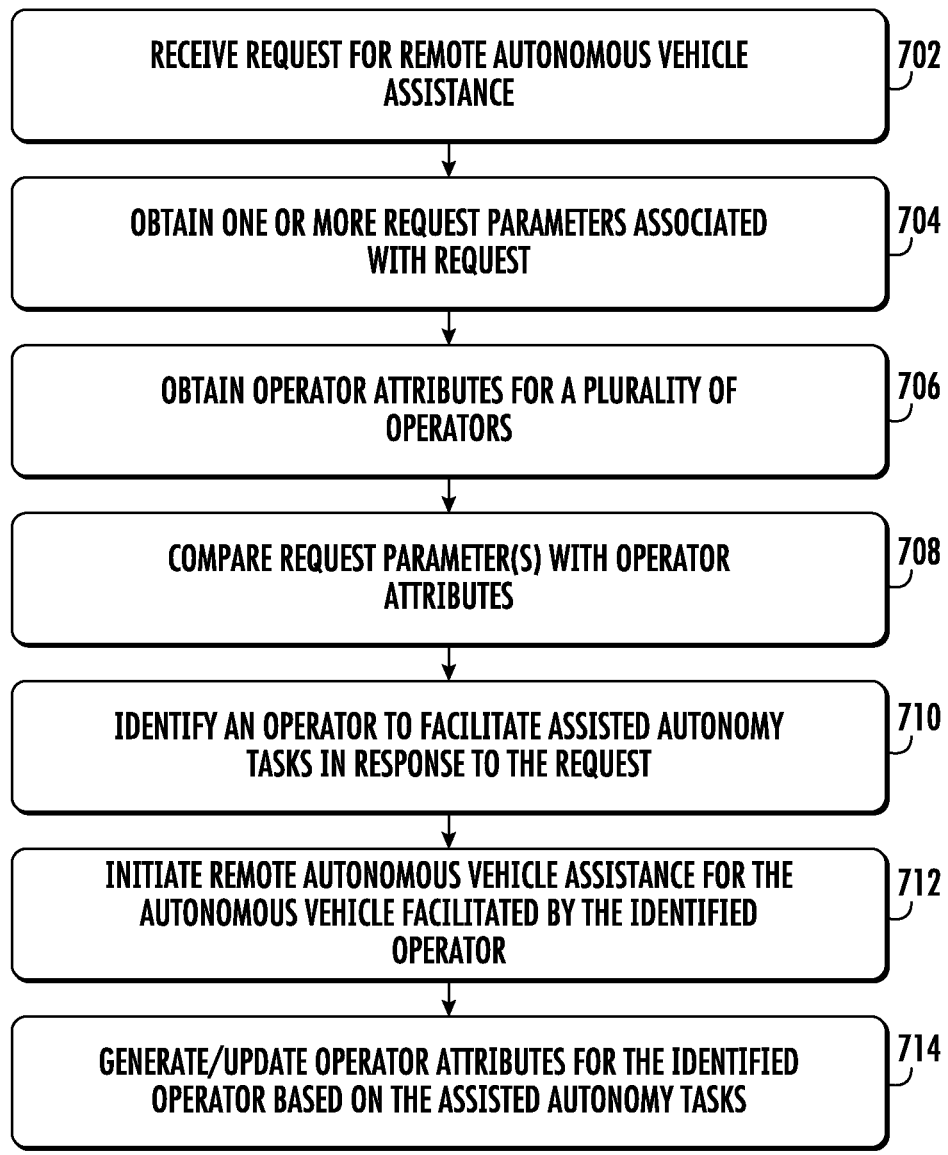
FIG. 7 depicts a flowchart illustrating an example method for initiating remote autonomous assistance according to example embodiments of the present disclosure.

FIG. 7 depicts a flowchart illustrating an example method for initiating remote autonomous assistance according to example embodiments of the present disclosure. In this example, the remote assistance system (e.g., remote assistance system 426 in FIG. 4) can receive at (702) a request for remote autonomous vehicle assistance. In some examples, the request can be sent automatically from an autonomous vehicle in response to detecting one or more tasks that the autonomous vehicle cannot complete without assistance. In other examples, the request can be sent in response to input from a passenger associated with autonomous vehicle. In some examples, a request for remote autonomous assistance may be received from a computing device separate from the autonomous vehicle. For example, a user of an autonomous vehicle service may send a request for assistance using a client device such as a smartphone, tablet, etc. A client device may initiate a telephone call to connect the user with an operations computing system. In some examples, the operations computing system can match a telephone number or other identifier with an existing vehicle or other service provided.

The operator selection system (e.g., system 424 in FIG. 4) can obtain at (704) one or more request parameters associated with the request or with the autonomous vehicle associated with the request. The one or more request parameters may be included with the request as received, or may be derived from the request (e.g., by analyzing data included within the request such as a vehicle identifier). In some examples, the one or more request parameters associated with the request for remote autonomous vehicle assistance include data indicative of at least one of: a location of the first autonomous vehicle, an identification of the first autonomous vehicle, a type of the first autonomous vehicle, a vendor of the first autonomous vehicle, one or more vehicle capabilities of the first autonomous vehicle, or an assistance type associated with the request for remote autonomous vehicle assistance. In some examples, the one or more request parameters comprise data indicative of a request for path assistance associated with a motion plan at a first geographic area. The one or more request parameters can include data indicative of an unclassified object at a first geographic area.

The operator selection system can obtain at (706) attributes for a plurality of operators. In some examples, the operator selection system accesses the operator attribute database to obtain operator attributes associated with the plurality of operators. In some examples, the operator selection system can access operator attributes based on the request attributes included in the received request for autonomous vehicle assistance. In some implementations, the respective plurality of operator attributes for each operator is associated with one or more time-identifiers indicative of a time associated with the one or more respective assisted autonomy tasks. The respective plurality of operator attributes for the operator can include data indicative of a previous assisted autonomy task associated with providing path assistance in association with the first geographic area. The respective plurality of operator attributes for the operator can include data indicative of a previous assisted autonomy task associated with providing classification assistance in association with the first geographic area.

In other examples, the respective plurality of operator attributes include data associated with at least the one or more respective assisted autonomy tasks facilitated by such operator. Data associated with one or more respective autonomy tasks can include, for each operator, data indicative of at least one of: one or more locations associated with at least the one or more respective assisted autonomy tasks, one or more vehicles associated with at least the one or more respective assisted autonomy tasks, one or more vehicle types associated with at least the one or more respective assisted autonomy tasks, one or more vendors associated with at least the one or more respective assisted autonomy tasks, one or more vehicle capabilities associated with at least the one or more respective assisted autonomy tasks, or one or more assistance types associated with at least the one or more respective assisted autonomy tasks.

The operator selection system can compare at (708) the request parameters with the operator attributes. For example, the operator selection system can determine whether a correspondence or match exists between a particular request parameter and a corresponding operator attribute. In some examples, the operator selection system can generate scores for individual operator attributes based on whether there exists a match with a request parameter from the request. The operator selection system can then generate an operator score for at least some of the potential operators based on the degree to which the individual operator attribute scores match the request parameters.

The operator selection system can identify at (710) an operator to facilitate assisted autonomy tasks in response to the request. For example, the operator selection system can determine an operator of the plurality of operators to facilitate one or more assisted autonomy tasks in response to the request for remote autonomous vehicle assistance based at least in part on the respective plurality of operator attributes for the identified operator and the one or more request parameters associated with the request for remote autonomous vehicle assistance. In some implementations, the operator is identified based, at least in part on, the one or more time identifiers indicative of the time associated with the one or more respective assisted autonomy tasks. In some implementations, the operator with the highest operator score for an operator attribute that is present in the request parameters for the received request for remote autonomous vehicle assistance is selected. In some examples, other factors, including work balancing for the operators and training objectives are used, in addition to operator score, when identifying an operator to facilitate assisted autonomy tasks in response to a request.

For example, the operator selection system can determine, for at least the identified operator, a temporal proximity associated with the request for remote autonomous vehicle assistance based at least in part on the one or more request parameters and the one or more time-identifiers associated with the respective plurality of operator attributes for the identified operator. The operator selection system can then determine, for at least the identified operator, a spatial proximity associated with the request for remote operator assistance based at least in part on the one or more request parameters and the respective plurality of operator attributes for the identified operator. In one example, the operator selection system can determine an operator to facilitate the one or more assisted autonomy tasks in response to the request based at least in part on the data indicative of the previous assisted autonomy task associated with providing classification assistance in association with the first geographic area. The operator selection system can provide an identifier such as an operator identifier of the selected one or more operators to the request assistance system.

The request assistance systems can initiate at (712) remote autonomous vehicle assistance for the autonomous vehicle facilitate by the identified operator. To do so, the remote assistance system can generate one or more user interfaces to display the sensor data to the selected operator via one or more operator computing devices. The user interfaces can provide imagery such as one or more images and/or video from an image sensor on board the autonomous vehicle (e.g., in at least near real-time while providing remote assistance). In some examples, a computing system initiates a transmission of sensor data from the first autonomous vehicle in response to initiating the remote autonomous vehicle assistance for the first autonomous vehicle facilitated by the identified operator.

The operator may analyze the sensor data provided by the autonomy computing system in order to generate task management data using an operator computing device. The operator computing device can perform one or more assisted autonomy tasks and generate task management data.

The request assistance system can obtain from the identified operator via at least one user interface, data associated with a target vehicle path at the first geographic area and transmit the data associated with the target vehicle path to an autonomy computing system (e.g., system 440 of FIG. 4) of the first autonomous vehicle. In another example, the request assistance system can obtain from the identified operator via at least one user interface, data associated with an object classification for the unclassified object at the first geographic area and transmit the data associated with the object classification for the unclassified object to an autonomy computing system of the first autonomous vehicle.

The task tracking system (410) can generate and/or update at (714) operator attributes for the identified operator based on the assisted autonomy tasks. To do so, the task tracking system can track a plurality of assisted autonomy tasks facilitated by a plurality of operators for a plurality of autonomous vehicles and generate a respective plurality of operator attributes for each operator of the plurality of operators based on tracking one or more respective assisted autonomy tasks facilitated by such operator. For example, a new operator attribute record can be added to the operator attribute database (e.g., database 422 in FIG. 4) based on the request parameters and actions of the operator during the current request.

In some examples, obtaining one or more request parameters, determining the identified operator, and initiating the remote autonomous vehicle assistance are performed by a vehicle provider computing system. In other examples, obtaining the one or more request parameters, determining the identified operator, and initiating the remote autonomous vehicle assistance are performed by an operations computing system.

In some implementations, the task management data is received via one or more user interfaces based on input from the identified operator and the one or more control commands are transmitted to an autonomy computing system of the first autonomous vehicle based on the task management data.

Figure 8:
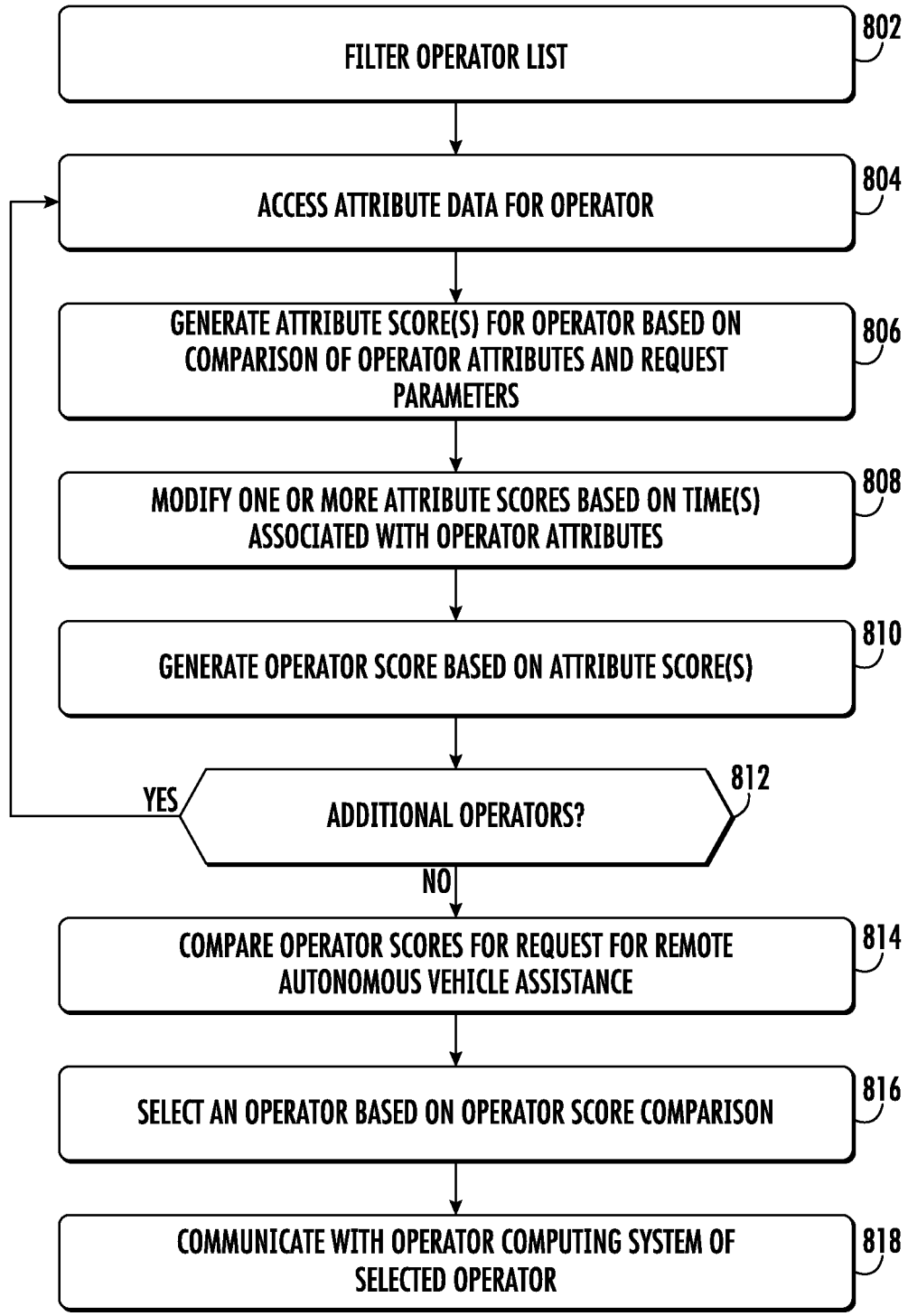
FIG. 8 depicts a flowchart illustrating an example method for selecting one or more operators to facilitate assisted autonomy tasks for remote autonomous assistance according to example embodiments of the present disclosure.

FIG. 8 depicts a flowchart illustrating an example method for selecting one or more operators to facilitate assisted autonomy tasks for remote autonomous assistance according to example embodiments of the present disclosure. In some example embodiments, the remote assistance system (e.g., remote assistance system 426 in FIG. 4) can filter at (802) a list of the plurality of operators based on one or more pre-request criteria. For example, a list of operators may be filtered based on those currently online with the autonomous vehicle assistance system (e.g., system 402 in FIG. 4). Other information may be used to filter a list to develop a set of operators that will be compared.

For each particular operator, the operator selection system (e.g., system 424 in FIG. 4) can access at (804) attribute data for that particular operator. As noted above, attribute data can be stored in an operator attribute database (e.g., database 422 in FIG. 4). The operator selection system can generate at (806) an attribute score for a plurality of operator attributes. The attribute scores may be generated based on a comparison of each operator attribute with a corresponding one or more resource parameters from the request. For example, a resource parameter may identify a vehicle type which can be compared with an operator attribute indicating vehicle types associated with an operator. A resource parameter may identify a vehicle capability which can be compared with an operator attribute indicating vehicle capabilities with which the operator has experience.

In some examples, the operator selection system can modify at (808) one or more attribute scores based on a time associated with the corresponding operator attribute. The time may indicate a time of performance of one or more of the assisted autonomy tasks for which the operator attribute was generated. For example, attribute scores may be reduced with time. However, the degree to which attribute scores are reduced may not be linear, such that the attributes score may be reduced quickly at first and then reduced more slowly over time.

The operator selection system can generate at (810) an operator score based on a combination of the one or more attribute scores generated for each operator. The operator score may identify an overall correspondence between a set of operator attributes and a set of resource parameters. The data may indicate a correlation or other correspondence between the operator attributes and the resource parameters. The operator selection system can determine at (812) whether additional operators are still available to be scored from the filtered list of operators. If so, the operator selection system repeats the above process (e.g., steps 804-810) for each operator in the filtered list of operators such that an operator score is generated for each of the filtered set of operators.

At (814), the operator selection system can compare operators scores for the filtered list of operators based on the request for autonomous vehicle assistance. The operator selection system can select at (816) one or more operators to facilitate one or more assisted autonomy tasks in response to the request for remote assistance. For example, an operator having a highest score or other indication of a high degree of correlation between operator attributes and resource parameters can be selected. The operator selection system can communicate at (818) with an operator computer system (e.g., one of 414*a*, 414*b*, and 414*c* in FIG. 4). For example, the remote assistance system can transmit data to the operator computer system associated with the selected one or more operators.

Figure 9:
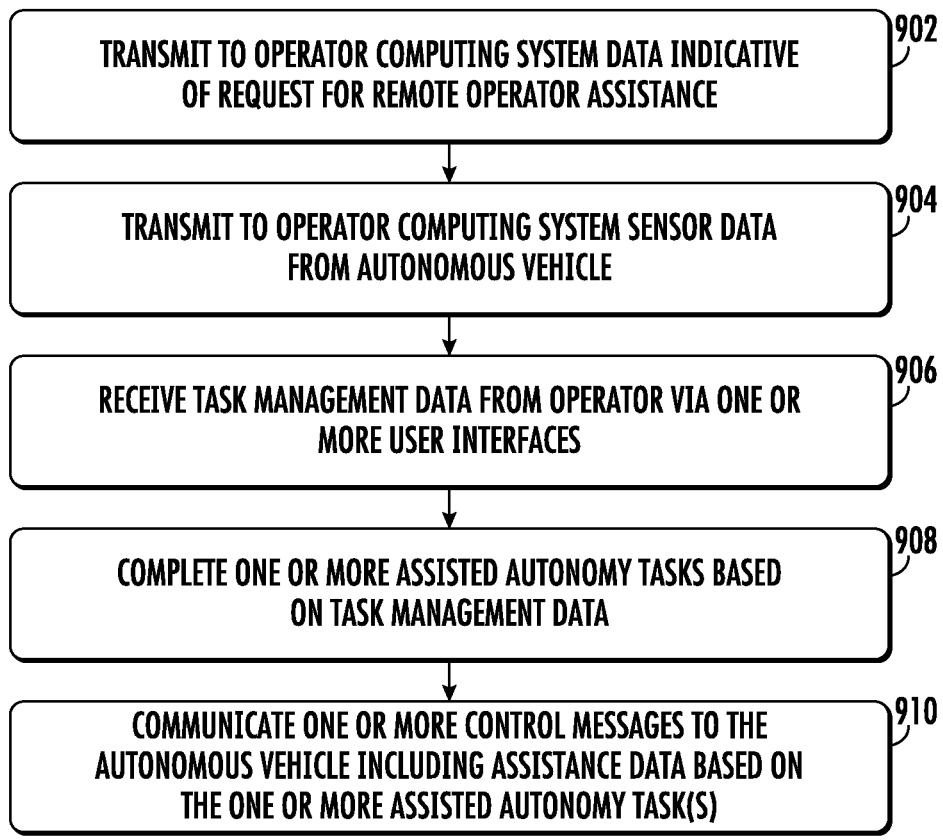
FIG. 9 depicts a flowchart illustrating an example method for communicating control messages based on task management data according to example embodiments of the present disclosure.

FIG. 9 depicts a flowchart illustrating an example method for communicating control messages based on task management data according to example embodiments of the present disclosure. The remote assistance system can transmit, at (902), to an operator computing system data indicative of the request for remote autonomous vehicle assistance. As noted above, the operator computing system that receives the data can be associated with an operator selected to match the request for remote autonomous vehicle assistance based on past operator experience. In some examples, the data indicative of the request for remote autonomous vehicle assistance includes data describing the autonomous vehicle and data indicative of the current situation of the autonomous vehicle.

The remote assistance system (e.g., system 426 in FIG. 4) can transmit at 904, sensor data from the autonomous vehicle to the operator selection system. As above, the operator computing system can be associated with an operator selected based on operator attributes and request parameters. The sensor data can then be displayed in a user interface at the operator computing system. The remote assistance system can receive at (906) task management data from an operator via one or more user interfaces. For example, an operator can, via a user interface displayed at the operator computing system, select one or more tasks to be performed in response to the request for remote autonomous vehicle assistance. In response, the operator computing system can transmit task management data representing the selected one or more tasks to the remote assistance system 426.

The remote assistance system can complete at (908) one or more assisted autonomy tasks based on task management data. The remote assistance system can communicate (910) one or more control messages to the autonomous vehicle including assistance data based on the one or more assisted autonomy tasks.

Figure 10:
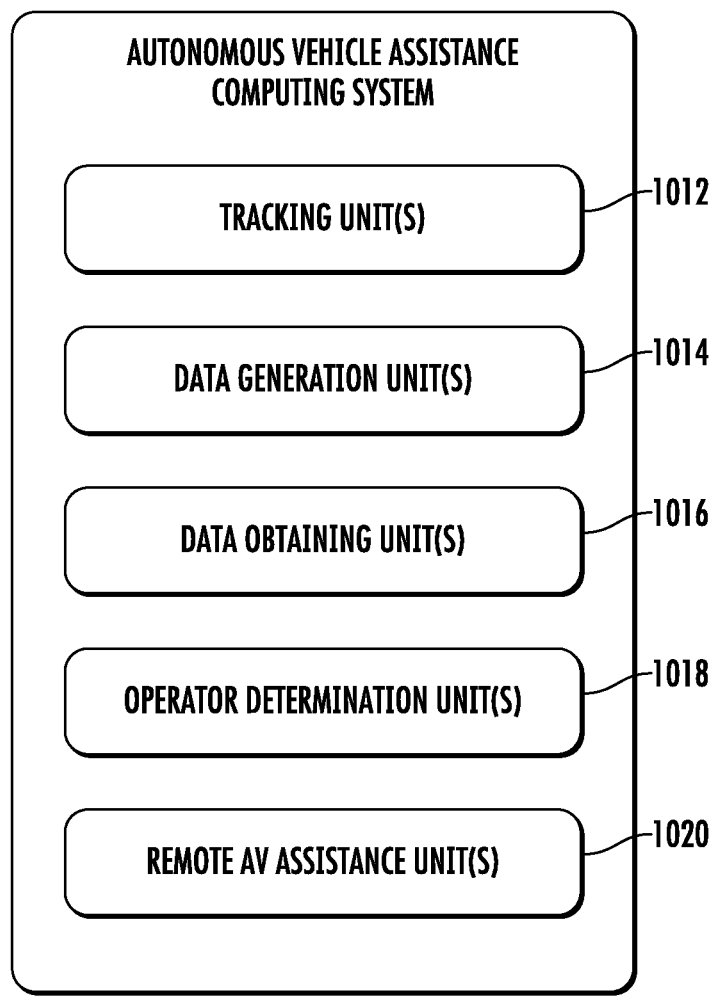
FIG. 10 depicts example system units for performing operations and functions according to example embodiments of the present disclosure.

Various means can be configured to perform the methods and processes described herein. For example, FIG. 10 depicts a diagram of an example computing system that can include tracking unit(s) 1012, data generation unit(s) 1014, data obtaining unit(s) 1016, operation determination unit(s) 1018, remote autonomous vehicle (AV) assistance unit(s) 1020, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to track a plurality of assisted autonomy tasks facilitated by a plurality of operators for a plurality of autonomous vehicles. For example, the means can be configured to generate tracking data indicative of information associated with the plurality of assisted autonomy tasks facilitated by the operators. A tracking unit 1012 is one example of a means for tracking a plurality of assisted autonomy tasks facilitated by plurality of operators for a plurality of autonomous vehicles as described herein.

The means can be configured to generate a respective plurality of operator attributes for each operator of the plurality of operators based on tracking one or more respective assisted autonomy tasks facilitated by such operator. For example, the means can be configured to generate operator attributes including data associated with at least the one or more respective assisted autonomy tasks facilitated by such operator. Operator attributes may include, but are not limited to, location(s) associated with respective assisted autonomy task(s), vehicles associated with respective assisted autonomy task(s), vehicle type(s) associated with respective assisted autonomy task(s), vendor(s) associated with respective assisted autonomy tasks, and assistance types associated with respective assisted autonomy task(s). A data generation unit 1014 is one example of a means for generating a respective plurality of operator attributes for each operator of the plurality of operators based on tracking one or more respective assisted autonomy tasks facilitated by such operator as described herein.

The means can be configured to obtain one or more request parameters associated with the request for remote autonomous vehicle assistance from a first autonomous vehicle of the plurality of autonomous vehicles. For example, the means can be configured to obtain request parameters such as data indicative of a location of an autonomous vehicle requesting assistance, an identification of the autonomous vehicle, a type of the autonomous vehicle, a vendor of the first autonomous vehicle, or an assistance type associated with the request for remote autonomous vehicle assistance. A data obtaining unit 1016 is one example of a means for obtaining one or more request parameters associated with the request for remote autonomous vehicle assistance from a first autonomous vehicle of the plurality of autonomous vehicles as described herein.

The means can be configured to determine a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance. For example, the means can be configured to compare the one or more request parameters with the operator attributes associated with the plurality of operators. Means can be configured to generate attribute scores, operator scores, as well as to wait attribute scores in our operator scores. The attribute scores and or operator scores can be used to identify a first operator having a set of operator attributes the most closely match the request parameters. An operator determination unit 1018 is one example of a means for determining a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance as described herein.

The means can be configured to initiate remote autonomous vehicle assistance for the first autonomous vehicle facilitated by the first operator in response to the request for remote autonomous vehicle assistance. For example, the means can be configured to send a message to an operator that it has been assigned to a particular request for remote autonomous vehicle assistance. The means can be configured to sensor data from the autonomous vehicle to an operator computing system associated with the selected operator. A remote autonomous vehicle (AV) assistance unit 1020 is one example of a means for initiating remote autonomous vehicle assistance for the first autonomous vehicle facilitated by the first operator in response to the request for remote autonomous vehicle assistance as described herein.

Figure 11:
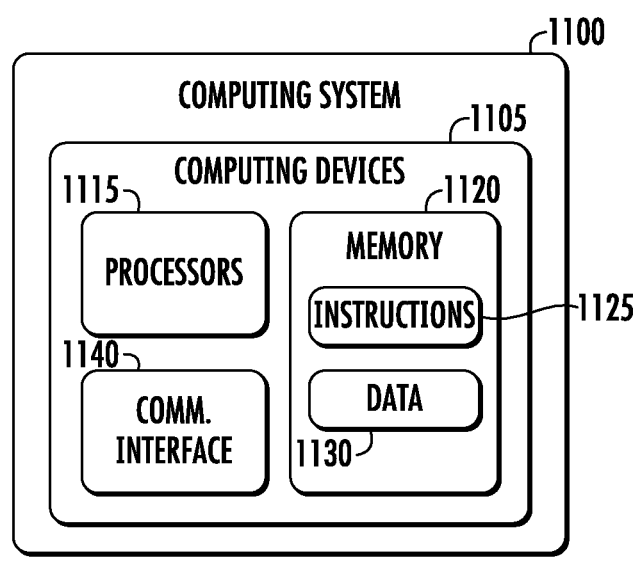
FIG. 11 depicts example system components according to example embodiments of the present disclosure.

FIG. 11 depicts a block diagram of an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The computing system 1100 can be and/or include the vehicle computing system 100 of FIG. 1. The computing system 1100 can be associated with a central operations system and/or an entity associated with the vehicle 105 such as, for example, a vehicle owner, vehicle manager, fleet operator, service provider, etc.

The computing device(s) 1105 of the computing system 1100 can include processor(s) 1115 and at least one memory 1120. The one or more processors 1115 can be any suitable processing device (e.g., a processor core, a microprocessor, an ASIC, a FPGA, a controller, a microcontroller, etc.) and can be one processor or a plurality of processors that are operatively connected. The memory 1120 can include one or more non-transitory computer-readable storage media, such as RAM, ROM, EEPROM, EPROM, one or more memory devices, flash memory devices, magnetic disks, data registers, etc., and combinations thereof.

The memory 1120 can store information that can be accessed by the one or more processors 1115. For instance, the memory 1120 (e.g., one or more non-transitory computer-readable storage mediums, memory devices) can include computer-readable instructions 806 that can be executed by the one or more processors 1115. The instructions 1125 can be software written in any suitable programming language or can be implemented in hardware. Additionally, or alternatively, the instructions 1125 can be executed in logically and/or virtually separate threads on processor(s) 1115

For example, the memory 1120 on-board the vehicle 105 can store instructions 1125 that when executed by the one or more processors 1115 cause the one or more processors 1115 (e.g., in the vehicle computing system 100) to perform operations such as any of the operations and functions of the computing device(s) 1105 and/or vehicle computing system 112, any of the operations and functions for which the vehicle computing system 100 is configured, and/or any other operations and functions described herein.

The memory 1120 can store data 1130 that can be obtained (e.g., received, accessed, written, manipulated, created, generated, etc.) and/or stored. The data 1130 can include, for instance, services data (e.g., trip data, route data, user data, etc.), sensor data, map data, perception data, prediction data, motion planning data, object states and/or state data, object motion trajectories, feedback data, fault data, log data, and/or other data/information as described herein. In some implementations, the computing device(s) 1105 can obtain data from one or more memories that are remote from the autonomous vehicle 105.

The computing device(s) 1105 can also include a communication interface 1140 used to communicate with one or more other system(s) (e.g., the remote computing system 620). The communication interface 1140 can include any circuits, components, software, etc. for communicating via one or more networks (e.g., network(s) 640). In some implementations, the communication interface 1140 can include, for example, one or more of a communications controller, receiver, transceiver, transmitter, port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for controlling autonomous vehicles, comprising:
    tracking, by a computing system comprising one or more computing devices, a plurality of assisted autonomy tasks facilitated by a plurality of operators for a plurality of autonomous vehicles;
    generating, by the computing system, a respective plurality of operator attributes for each operator of the plurality of operators based on tracking one or more respective assisted autonomy tasks facilitated by such operator;
    obtaining, by the computing system, one or more request parameters corresponding to a request for remote autonomous vehicle assistance associated with a first autonomous vehicle;
    determining, by the computing system, a first operator of the plurality of operators to facilitate one or more assisted autonomy tasks in response to the request for remote autonomous vehicle assistance based at least in part on the respective plurality of operator attributes for the first operator and the one or more request parameters associated with the request for remote autonomous vehicle assistance; and
    initiating, by the computing system, remote autonomous vehicle assistance for the first autonomous vehicle facilitated by the first operator in response to the request for remote autonomous vehicle assistance.

2. The computer-implemented method of claim 1, wherein the respective plurality of operator attributes for each operator is associated with one or more time identifiers indicative of a time associated with the one or more respective assisted autonomy tasks.

3. The computer-implemented method of claim 2, wherein determining the first operator of the plurality of operators to facilitate one or more assisted autonomy tasks is based at least in part on the one or more time identifiers indicative of the time associated with the one or more respective assisted autonomy tasks.

4. The computer-implemented method of claim 3, further comprising:
    determining, for at least the first operator, a temporal proximity associated with the request for remote autonomous vehicle assistance based at least in part on the one or more request parameters and the one or more time identifiers associated with the respective plurality of operator attributes for the first operator; and
    determining, for at least the first operator, a spatial proximity associated with the request for remote operator assistance based at least in part on the one or more request parameters and the respective plurality of operator attributes for the first operator.

5. The computer-implemented method of claim 1, wherein the one or more request parameters associated with the request for remote autonomous vehicle assistance comprise data indicative of at least one of a location of the first autonomous vehicle, an identification of the first autonomous vehicle, a type of the first autonomous vehicle, a vendor of the first autonomous vehicle, one or more vehicle capabilities of the first autonomous vehicle, or an assistance type associated with the request for remote autonomous vehicle assistance.

6. The computer-implemented method of claim 1, wherein the respective plurality of operator attributes for each operator of the plurality of operators comprises data associated with at least the one or more respective assisted autonomy tasks facilitated by such operator.

7. The computer-implemented method of claim 6, wherein the data associated with at least the one or more respective assisted autonomy tasks facilitated by such operator comprises, for such operator, data indicative of at least one of:
    one or more locations associated with at least the one or more respective assisted autonomy tasks, one or more vehicles associated with at least the one or more respective assisted autonomy tasks, one or more vehicle types associated with at least the one or more respective assisted autonomy tasks, one or more vendors associated with at least the one or more respective assisted autonomy tasks, one or more vehicle capabilities associated with at least the one or more respective assisted autonomy tasks, or one or more assistance types associated with at least the one or more respective assisted autonomy tasks.

8. The computer-implemented method of claim 1, wherein:
    the one or more request parameters comprise data indicative of a request for path assistance associated with a motion plan at a first geographic area;
    the respective plurality of operator attributes for the first operator comprises data indicative of a previous assisted autonomy task associated with providing path assistance in association with the first geographic area; and determining the first operator to facilitate one or more assisted autonomy tasks in response to the request is based at least in part on the data indicative of the previous assisted autonomy task associated with providing path assistance in association with the first geographic area.

9. The computer-implemented method of claim 8, further comprising:
obtaining, by the computing system from the first operator via at least one user interface, data associated with a target vehicle path at the first geographic area; and
transmitting, by the computing system, the data associated with the target vehicle path to an autonomy computing system of the first autonomous vehicle.

10. The computer-implemented method of claim 1, wherein:
the one or more request parameters comprise data indicative of an unclassified object at a first geographic area;
the respective plurality of operator attributes for the first operator comprises data indicative of a previous assisted autonomy task associated with providing classification assistance in association with the first geographic area; and
determining the first operator to facilitate the one or more assisted autonomy tasks in response to the request is based at least in part on the data indicative of the previous assisted autonomy task associated with providing classification assistance in association with the first geographic area.

11. The computer-implemented method of claim 10, further comprising:
obtaining, by the computing system from the first operator via at least one user interface, data associated with an object classification for the unclassified object at the first geographic area; and
transmitting, by the computing system, the data associated with the object classification for the unclassified object to an autonomy computing system of the first autonomous vehicle.

12. The computer-implemented method of claim 1, further comprising:
initiating, by the computing system, a transmission of sensor data from the first autonomous vehicle in response to initiating the remote autonomous vehicle assistance for the first autonomous vehicle facilitated by the first operator; and
generating, by the computing system, one or more graphical user interfaces including a representation of the sensor data from the first autonomous vehicle.

13. The computer-implemented method of claim 1, wherein:
the computing system includes a vehicle provider computing system; and
the vehicle provider computing system performs said obtaining one or more request parameters, said determining the first operator, and said initiating the remote autonomous vehicle assistance.

14. The computer-implemented method of claim 1, wherein:
the computing system includes an operations computing system;
the operations computing system performs said obtaining the one or more request parameters, said determining the first operator, and said initiating the remote autonomous vehicle assistance.

15. The computer-implemented method of claim 1, wherein initiating remote autonomous vehicle assistance with the first autonomous vehicle comprises:
receiving, by the computing system, task management data via one or more user interfaces based on input from the first operator; and
transmitting, by the computing system, one or more control commands to an autonomy computing system of the first autonomous vehicle based on the task management data.

16. The computer-implemented method of claim 1, further comprising:
receiving a telephone call including the request for remote autonomous vehicle assistance.

17. A computing system comprising:
one or more processors; and
one or more tangible, non-transitory, computer-readable media that collectively store instructions that when executed by the one or more processors cause the computing system to perform operations comprising:
obtaining one or more request parameters associated with a request from a first autonomous vehicle for remote autonomous vehicle assistance with one or more autonomous computing tasks performed by an autonomous computing system of the first autonomous vehicle;
obtaining a respective plurality of operator attributes for each operator of a plurality of operators associated with facilitating remote autonomous vehicle assistance for a plurality of autonomous vehicles, the respective plurality of operator attributes for each operator including data associated with a respective plurality of assisted autonomy tasks previously facilitated by such operator;
determining a first operator of the plurality of operators to facilitate one or more assisted autonomy tasks in response to the request for remote autonomous vehicle assistance based at least in part on the respective plurality of operator attributes for the first operator and the one or more request parameters associated with the request from the first autonomous vehicle for remote autonomous vehicle assistance; and
initiating remote autonomous vehicle assistance for the first autonomous vehicle facilitated by the first operator.

18. The computing system of claim 17, wherein:
the respective plurality of operator attributes for each operator is associated with one or more time identifiers indicative of a time associated with the respective plurality of assisted autonomy tasks; and
determining the first operator of the plurality of operators to facilitate the one or more assisted autonomy tasks is based at least in part on the one or more time identifiers indicative of the time associated with the respective plurality of assisted autonomy tasks.

19. The computing system of claim 18, wherein the operations further comprise:
determining, for at least the first operator, a temporal proximity associated with the request for remote autonomous vehicle assistance based at least in part on the one or more request parameters and the one or more time identifiers associated with the respective plurality of operator attributes for the first operator; and
determining, for at least the first operator, a spatial proximity associated with the request for remote autonomous vehicle assistance based at least in part on the one or more request parameters and the respective plurality of operator attributes for the first operator.

20. A computer-implemented method for controlling autonomous vehicles, comprising:
- receiving, by a computing system comprising one or more computing devices, a communication from a first user computing device associated with a request for assistance with an autonomous vehicle service, the communication being received via a request interface of the computing system, the request interface configured to communicate with a plurality of user computing devices including the first user computing device;
- determining, by the computing system, an autonomous vehicle corresponding to the autonomous vehicle service based at least in part on the communication from the first user computing device;
- generating, by the computing system, assistance data in response to the request for assistance with the autonomous vehicle service; and
- transmitting, by the computing system, one or more control messages via a vehicle interface of the computing system to an onboard computing device physically coupled to the autonomous vehicle, wherein the one or more control messages comprise the assistance data and the onboard computing device is configured to generate one or more graphical user interfaces for a display of the onboard computing device in response to the one or more control messages, the one or more graphical user interfaces including at least one graphical element based on the assistance data, and at least one of the one or more control messages being to modify at least one vehicle control of the first autonomous vehicle.

* * * * *